United States Patent
Vance et al.

(10) Patent No.: US 8,370,770 B2
(45) Date of Patent: ***Feb. 5, 2013

(54) VARIABLE PATH MANAGEMENT OF USER CONTACTS

(75) Inventors: Michael Steffen Vance, Kenmore, WA (US); Jasdeep Singh Chugh, Renton, WA (US); Jared T. Benson, Pleasant Hill, CA (US); Christian Robertson, Concord, CA (US); Shilpa R. Shah, Oakland, CA (US); Gabriel J. White, San Francisco, CA (US); Charles Goran, Seattle, WA (US); Valerie Lynn Goulart, Seattle, WA (US); Feridoon Malekzadeh, Seattle, WA (US); Alejandro J. Amano-Palacios, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 699 days.

This patent is subject to a terminal disclaimer.

(21) Appl. No.: 12/413,148

(22) Filed: Mar. 27, 2009

(65) Prior Publication Data

US 2010/0037144 A1  Feb. 11, 2010

Related U.S. Application Data

(63) Continuation-in-part of application No. 11/400,925, filed on Apr. 10, 2006, now Pat. No. 7,685,530.

(60) Provisional application No. 60/689,581, filed on Jun. 10, 2005.

(51) Int. Cl.
   *G06F 3/00*  (2006.01)
(52) U.S. Cl. .......................... 715/834; 715/825; 715/764
(58) Field of Classification Search ................... 715/834
   See application file for complete search history.

(56) References Cited

U.S. PATENT DOCUMENTS 4,723,209 A   2/1988  Hernandez et al.
D296,218 S    6/1988  Wells-Papanek et al.
(Continued)

FOREIGN PATENT DOCUMENTS

DE   10155431    6/2003
EP   0767418 A1  4/1997
(Continued)

OTHER PUBLICATIONS

AT&T, *LG Xenon User Guide*, Apr. 8, 2009, pp. 1-146.
(Continued)

*Primary Examiner* — Ryan Pitaro
(74) *Attorney, Agent, or Firm* — Knobbe, Martens, Olson & Bear, LLP

(57) ABSTRACT

Systems, methods, and computer-readable mediums for managing a subset of user contacts on a telecommunications device are provided. In one embodiment, a software application executed by a processor of a telecommunications device identifies a subset of contacts selected at least in part by a user of the telecommunications device. The subset of contacts includes a portion of the user's contacts accessible by the telecommunications device. The software application executed by the processor of the telecommunications device then causes display of a first portion of graphical identifiers associated with a first portion of the subset of contacts along a first path on a display of the telecommunications device about an axis positioned external to the display of the telecommunications device. The software application further causes display of a second portion of graphical identifiers associated with a second portion of the subset of contacts along a second path on the display of the telecommunications device about the external axis. Aspects of systems, methods, and computer-readable mediums for further arranging the graphical identifiers are also provided. Even further, aspects of systems, methods, and computer-readable mediums for providing functionality associated with the graphical identifiers are provided.

38 Claims, 11 Drawing Sheets

U.S. PATENT DOCUMENTS

| | | |
|---|---|---|
| D298,144 S | 10/1988 | Wells-Papanek et al. |
| D384,052 S | 9/1997 | Kodosky |
| D388,424 S | 12/1997 | DeMuro et al. |
| D391,948 S | 3/1998 | Eisenberg |
| 5,724,531 A | 3/1998 | Miyashita et al. |
| 5,751,980 A | 5/1998 | Musashi et al. |
| D395,427 S | 6/1998 | Arora et al. |
| 5,793,365 A | 8/1998 | Tang et al. |
| 5,796,394 A | 8/1998 | Wicks et al. |
| D397,687 S | 9/1998 | Arora et al. |
| D398,595 S | 9/1998 | Baer et al. |
| 5,822,123 A | 10/1998 | Davis et al. |
| 5,867,226 A | 2/1999 | Wehmeyer et al. |
| 5,880,733 A | 3/1999 | Horvitz et al. |
| 5,889,517 A | 3/1999 | Ueda et al. |
| D415,483 S | 10/1999 | Decker |
| 5,987,107 A | 11/1999 | Brown |
| 6,006,200 A | 12/1999 | Boies et al. |
| 6,023,275 A | 2/2000 | Horvitz et al. |
| D424,036 S | 5/2000 | Arora et al. |
| D424,541 S | 5/2000 | Mugura |
| 6,130,726 A | 10/2000 | Darbee et al. |
| 6,144,863 A | 11/2000 | Charron |
| 6,151,059 A | 11/2000 | Schein et al. |
| D437,858 S | 2/2001 | Yasui et al. |
| 6,188,406 B1 | 2/2001 | Fong et al. |
| D438,873 S | 3/2001 | Wang et al. |
| 6,201,957 B1 | 3/2001 | Son et al. |
| D440,979 S | 4/2001 | Wang et al. |
| 6,236,398 B1 * | 5/2001 | Kojima et al. ................ 345/419 |
| 6,249,863 B1 | 6/2001 | Redford et al. |
| D445,426 S | 7/2001 | Wang et al. |
| D446,790 S | 8/2001 | Wang et al. |
| 6,313,877 B1 | 11/2001 | Anderson |
| D454,138 S | 3/2002 | Imamura et al. |
| D454,139 S | 3/2002 | Feldcamp |
| 6,359,635 B1 | 3/2002 | Perttunen |
| 6,393,430 B1 | 5/2002 | Van Ryzin |
| D459,361 S | 6/2002 | Inagaki |
| D463,444 S | 9/2002 | Istvan et al. |
| 6,460,181 B1 | 10/2002 | Donnelly |
| 6,486,870 B1 | 11/2002 | Kozu |
| D467,252 S | 12/2002 | Lee |
| D469,442 S | 1/2003 | Bohlen, Jr. et al. |
| D470,857 S | 2/2003 | Anderson et al. |
| D471,226 S | 3/2003 | Gray |
| 6,532,459 B1 | 3/2003 | Berson |
| 6,538,635 B1 | 3/2003 | Ringot |
| D472,902 S | 4/2003 | Nashida et al. |
| D473,236 S | 4/2003 | Robbin et al. |
| D474,198 S | 5/2003 | Barnes |
| D474,778 S | 5/2003 | Barnes |
| D475,064 S | 5/2003 | Nashida et al. |
| 6,563,515 B1 | 5/2003 | Reynolds et al. |
| 6,577,330 B1 | 6/2003 | Tsuda et al. |
| 6,600,936 B1 | 7/2003 | Karkkainen et al. |
| D478,912 S | 8/2003 | Johnson |
| D485,279 S | 1/2004 | DeCombe |
| 6,678,891 B1 | 1/2004 | Wilcox et al. |
| D486,499 S | 2/2004 | Hayashi et al. |
| 6,741,268 B1 | 5/2004 | Hayakawa |
| 6,757,365 B1 | 6/2004 | Bogard |
| D495,339 S | 8/2004 | Gildred |
| 6,775,659 B2 | 8/2004 | Clifton-Bligh |
| D495,715 S | 9/2004 | Gildred |
| 6,788,987 B2 | 9/2004 | Slechta et al. |
| 6,801,849 B2 | 10/2004 | Szukala et al. |
| 6,845,153 B2 | 1/2005 | Tiburtius et al. |
| 6,850,255 B2 | 2/2005 | Muschetto |
| 6,865,404 B1 | 3/2005 | Tikkala et al. |
| D506,474 S | 6/2005 | Gildred |
| 6,907,575 B2 | 6/2005 | Duarte |
| D507,577 S | 7/2005 | Totten et al. |
| 6,925,650 B1 | 8/2005 | Arsenault et al. |
| D510,581 S | 10/2005 | Robbin et al. |
| 6,959,207 B2 | 10/2005 | Keinonen et al. |
| 6,975,712 B1 | 12/2005 | Schnarel et al. |
| 6,978,473 B1 | 12/2005 | Nsonwu et al. |
| 7,036,091 B1 | 4/2006 | Nguyen et al. |
| 7,046,993 B2 | 5/2006 | Haaramo et al. |
| D523,439 S | 6/2006 | Kuroda |
| D523,440 S | 6/2006 | Hernandez et al. |
| D523,868 S | 6/2006 | Kuroda |
| 7,083,109 B2 | 8/2006 | Pouchak |
| 7,086,008 B2 | 8/2006 | Capps et al. |
| 7,089,287 B2 | 8/2006 | Bellotti et al. |
| 7,099,862 B2 | 8/2006 | Fitzpatrick et al. |
| D528,556 S | 9/2006 | Decombre |
| 7,111,788 B2 | 9/2006 | Reponen |
| 7,117,445 B2 | 10/2006 | Berger |
| 7,137,073 B2 | 11/2006 | Kim et al. |
| 7,174,516 B2 * | 2/2007 | Chipchase ..................... 715/763 |
| 7,178,109 B2 | 2/2007 | Hewson et al. |
| 7,187,761 B2 | 3/2007 | Bookstaff |
| D540,340 S | 4/2007 | Cummins |
| D543,986 S | 6/2007 | Rimas-Ribikauskas et al. |
| D543,987 S | 6/2007 | Rimas-Ribikauskas et al. |
| D543,992 S | 6/2007 | Vigesaa |
| D544,875 S | 6/2007 | Wang et al. |
| D544,877 S | 6/2007 | Sasser |
| D545,324 S | 6/2007 | Decombe |
| 7,231,229 B1 | 6/2007 | Hawkins et al. |
| 7,236,576 B2 | 6/2007 | Schnarel et al. |
| 7,236,780 B2 | 6/2007 | Benco et al. |
| D545,827 S | 7/2007 | Evans et al. |
| D545,832 S | 7/2007 | Armendariz |
| D547,321 S | 7/2007 | Viegers et al. |
| 7,248,677 B2 | 7/2007 | Randall et al. |
| 7,248,857 B1 | 7/2007 | Richardson et al. |
| D548,239 S | 8/2007 | Rimas-Ribikauskas et al. |
| D548,743 S | 8/2007 | Takahashi et al. |
| D550,681 S | 9/2007 | Totten et al. |
| D551,252 S | 9/2007 | Andre et al. |
| D552,114 S | 10/2007 | Tolle et al. |
| D554,142 S | 10/2007 | Cameron |
| 7,280,652 B2 | 10/2007 | Bocking et al. |
| D554,652 S | 11/2007 | Shen et al. |
| D556,765 S | 12/2007 | Evans et al. |
| D557,268 S | 12/2007 | Fletcher |
| D558,221 S | 12/2007 | Nagata et al. |
| D562,343 S | 2/2008 | Fletcher |
| 7,330,845 B2 | 2/2008 | Lee et al. |
| D563,972 S | 3/2008 | Sherry |
| 7,343,565 B2 | 3/2008 | Ying et al. |
| D565,586 S | 4/2008 | Shin et al. |
| D565,627 S | 4/2008 | Kase |
| D567,251 S | 4/2008 | Sadler |
| D567,817 S | 4/2008 | Kwag et al. |
| 7,360,174 B2 | 4/2008 | Grossman et al. |
| D568,334 S | 5/2008 | Okaro et al. |
| D568,897 S | 5/2008 | Byeon |
| D568,898 S | 5/2008 | Byeon |
| D568,899 S | 5/2008 | Byeon |
| D569,387 S | 5/2008 | Byeon |
| 7,369,850 B2 | 5/2008 | Andrew et al. |
| D570,369 S | 6/2008 | Fletcher |
| D571,819 S | 6/2008 | Scott et al. |
| D573,601 S | 7/2008 | Gregov et al. |
| D574,392 S | 8/2008 | Kwag et al. |
| D575,297 S | 8/2008 | Glezer et al. |
| D575,298 S | 8/2008 | Chen et al. |
| D575,792 S | 8/2008 | Benson |
| D576,174 S | 9/2008 | Ording et al. |
| D577,364 S | 9/2008 | Flynt et al. |
| D578,134 S | 10/2008 | Jasinski |
| D578,543 S | 10/2008 | Ulm et al. |
| 7,437,005 B2 | 10/2008 | Drucker et al. |
| D580,450 S | 11/2008 | Chen et al. |
| D580,946 S | 11/2008 | Chen et al. |
| 7,450,927 B1 | 11/2008 | Creswell et al. |
| D582,426 S | 12/2008 | Chen et al. |
| D582,928 S | 12/2008 | Blankenship et al. |
| D583,823 S | 12/2008 | Chen et al. |
| D584,737 S | 1/2009 | Stone et al. |
| D585,453 S | 1/2009 | Chen et al. |
| D585,454 S | 1/2009 | Ismail |
| D586,361 S | 2/2009 | Horowitz et al. |

| | | |
|---|---|---|
| D586,362 S | 2/2009 | Horowitz et al. |
| 7,490,295 B2 | 2/2009 | Chaudhri et al. |
| D588,148 S | 3/2009 | Stone et al. |
| D588,149 S | 3/2009 | Brownell et al. |
| D588,150 S | 3/2009 | Stone et al. |
| 7,503,014 B2 * | 3/2009 | Tojo et al. ............ 715/810 |
| D589,970 S | 4/2009 | Bhat et al. |
| D590,407 S | 4/2009 | Watanabe et al. |
| D590,412 S | 4/2009 | Saft et al. |
| 7,526,306 B2 | 4/2009 | Brems et al. |
| D592,218 S | 5/2009 | Blankenship et al. |
| D592,674 S | 5/2009 | Kwag |
| D593,120 S | 5/2009 | Bouchard et al. |
| 7,536,654 B2 | 5/2009 | Anthony et al. |
| D593,574 S | 6/2009 | Guimaraes et al. |
| D593,576 S | 6/2009 | Ball et al. |
| D594,015 S | 6/2009 | Singh et al. |
| D594,465 S | 6/2009 | Hong et al. |
| D594,872 S | 6/2009 | Akimoto |
| 7,543,245 B2 * | 6/2009 | Irimajiri ............ 715/836 |
| 7,546,543 B2 | 6/2009 | Louch et al. |
| 7,555,727 B2 | 6/2009 | Hawkins et al. |
| D596,192 S | 7/2009 | Shotel |
| 7,562,304 B2 | 7/2009 | Dixon et al. |
| 7,577,700 B2 | 8/2009 | Tolson et al. |
| D599,368 S | 9/2009 | Kanga et al. |
| D599,806 S | 9/2009 | Brown et al. |
| D599,807 S | 9/2009 | Marashi |
| D599,810 S | 9/2009 | Scalisi et al. |
| D599,811 S | 9/2009 | Watanabe et al. |
| D599,812 S | 9/2009 | Hirsch |
| D599,813 S | 9/2009 | Hirsch |
| D599,814 S | 9/2009 | Ogura et al. |
| D601,153 S | 9/2009 | Setiawan et al. |
| 7,587,683 B2 | 9/2009 | Ito et al. |
| D602,038 S | 10/2009 | Channell et al. |
| 7,603,628 B2 | 10/2009 | Park et al. |
| D603,415 S | 11/2009 | Lin et al. |
| D603,416 S | 11/2009 | Poling et al. |
| D603,418 S | 11/2009 | Magnani et al. |
| D603,420 S | 11/2009 | Channell |
| D603,867 S | 11/2009 | La et al. |
| D604,310 S | 11/2009 | Ahn |
| D604,316 S | 11/2009 | Hoefnagels et al. |
| D604,317 S | 11/2009 | Hoefnagels et al. |
| D604,740 S | 11/2009 | Matheny et al. |
| 7,620,996 B2 | 11/2009 | Torres et al. |
| D605,200 S | 12/2009 | Sakai |
| D605,652 S | 12/2009 | Plaisted et al. |
| D605,653 S | 12/2009 | Danton |
| D606,088 S | 12/2009 | Yokouchi et al. |
| D606,550 S | 12/2009 | La et al. |
| D607,002 S | 12/2009 | Jonasson et al. |
| 7,636,889 B2 | 12/2009 | Weber et al. |
| D608,364 S | 1/2010 | Walsh et al. |
| D608,366 S | 1/2010 | Matas |
| D608,367 S | 1/2010 | Scalisi et al. |
| D608,368 S | 1/2010 | Bamford |
| 7,646,745 B2 | 1/2010 | Caldwell et al. |
| 7,650,361 B1 | 1/2010 | Wong et al. |
| D609,714 S | 2/2010 | Oda et al. |
| D609,715 S | 2/2010 | Chaudhri |
| D610,159 S | 2/2010 | Matheny et al. |
| D610,161 S | 2/2010 | Matas |
| 7,665,028 B2 | 2/2010 | Cummins et al. |
| 7,665,033 B2 | 2/2010 | Byrne et al. |
| D611,056 S | 3/2010 | Langlois et al. |
| D611,484 S | 3/2010 | Mays et al. |
| D611,485 S | 3/2010 | Marashi |
| D611,489 S | 3/2010 | Bell et al. |
| D611,490 S | 3/2010 | Lee et al. |
| D612,394 S | 3/2010 | La et al. |
| D612,860 S | 3/2010 | Tarara et al. |
| 7,673,017 B2 | 3/2010 | Kim et al. |
| 7,685,520 B2 | 3/2010 | Rashkovskiy et al. |
| 7,685,530 B2 | 3/2010 | Sherrard et al. |
| D613,300 S | 4/2010 | Chaudhri |
| D613,747 S | 4/2010 | Jonasson et al. |
| D614,191 S | 4/2010 | Takano et al. |
| D614,192 S | 4/2010 | Takano et al. |
| D614,633 S | 4/2010 | Watanabe et al. |
| D614,643 S | 4/2010 | Viegers et al. |
| D614,646 S | 4/2010 | Chen et al. |
| 7,702,543 B2 | 4/2010 | MacKay et al. |
| D615,090 S | 5/2010 | Sogabe |
| D615,546 S | 5/2010 | Lundy et al. |
| D615,549 S | 5/2010 | Caine et al. |
| 7,720,498 B2 | 5/2010 | Lee |
| D617,804 S | 6/2010 | Hirsch |
| D617,805 S | 6/2010 | Scalisi et al. |
| D618,250 S | 6/2010 | Stallings et al. |
| D619,593 S | 7/2010 | Fujioka et al. |
| D619,594 S | 7/2010 | Jonasson et al. |
| D620,948 S | 8/2010 | Scalisi et al. |
| D621,844 S | 8/2010 | Van Os |
| D621,845 S | 8/2010 | Anzures et al. |
| D622,280 S | 8/2010 | Tarara |
| 7,797,641 B2 * | 9/2010 | Karukka et al. ............ 715/802 |
| D625,325 S | 10/2010 | Vu et al. |
| D626,136 S | 10/2010 | Fujimura |
| D627,790 S | 11/2010 | Chaudhri |
| D628,206 S | 11/2010 | Lemay |
| 7,898,600 B2 | 3/2011 | Lee et al. |
| D638,025 S | 5/2011 | Saft et al. |
| 7,971,222 B2 | 6/2011 | Ellis |
| 8,046,801 B2 | 10/2011 | Ellis et al. |
| 2001/0044743 A1 | 11/2001 | McKinley et al. |
| 2002/0045960 A1 | 4/2002 | Phillips et al. |
| 2002/0052754 A1 | 5/2002 | Joyce et al. |
| 2002/0054164 A1 * | 5/2002 | Uemura ............ 345/848 |
| 2002/0059201 A1 | 5/2002 | Work |
| 2002/0145623 A1 | 10/2002 | Decombe |
| 2003/0014179 A1 | 1/2003 | Szukala et al. |
| 2003/0164818 A1 | 9/2003 | Miller-Smith et al. |
| 2003/0224816 A1 | 12/2003 | Kundaje et al. |
| 2003/0225879 A1 | 12/2003 | Chipchase |
| 2004/0017376 A1 * | 1/2004 | Tagliabue et al. ............ 345/581 |
| 2004/0041836 A1 | 3/2004 | Zaner et al. |
| 2004/0046796 A1 | 3/2004 | Fujita |
| 2004/0067751 A1 | 4/2004 | Vandermeijden |
| 2004/0075691 A1 | 4/2004 | Moon |
| 2004/0077340 A1 | 4/2004 | Forsyth |
| 2004/0091093 A1 | 5/2004 | Bookstaff |
| 2004/0100479 A1 * | 5/2004 | Nakano et al. ............ 345/700 |
| 2004/0102225 A1 | 5/2004 | Furuta et al. |
| 2004/0119758 A1 | 6/2004 | Grossman et al. |
| 2004/0122684 A1 | 6/2004 | Kaikuranta |
| 2004/0133638 A1 | 7/2004 | Doss et al. |
| 2004/0162812 A1 | 8/2004 | Lane |
| 2004/0172455 A1 | 9/2004 | Green et al. |
| 2004/0185890 A1 | 9/2004 | Drozt et al. |
| 2004/0221239 A1 | 11/2004 | Hachigian et al. |
| 2004/0235520 A1 | 11/2004 | Cadiz et al. |
| 2004/0239982 A1 | 12/2004 | Gignac |
| 2004/0250217 A1 | 12/2004 | Tojo et al. |
| 2004/0268228 A1 | 12/2004 | Croney et al. |
| 2004/0268265 A1 | 12/2004 | Berger |
| 2005/0005235 A1 | 1/2005 | Satterfield et al. |
| 2005/0010876 A1 | 1/2005 | Robertson et al. |
| 2005/0020243 A1 | 1/2005 | Benco et al. |
| 2005/0033603 A1 | 2/2005 | Suzuki et al. |
| 2005/0039140 A1 | 2/2005 | Chen |
| 2005/0041011 A1 | 2/2005 | Silfverberg et al. |
| 2005/0071780 A1 | 3/2005 | Muller et al. |
| 2005/0079863 A1 | 4/2005 | Macaluso |
| 2005/0086611 A1 * | 4/2005 | Takabe et al. ............ 715/823 |
| 2005/0091272 A1 | 4/2005 | Smith et al. |
| 2005/0094205 A1 | 5/2005 | Lo et al. |
| 2005/0114374 A1 | 5/2005 | Juszkiewicz et al. |
| 2005/0118996 A1 | 6/2005 | Lee et al. |
| 2005/0120306 A1 | 6/2005 | Klassen et al. |
| 2005/0143135 A1 | 6/2005 | Brems et al. |
| 2005/0143138 A1 | 6/2005 | Lee et al. |
| 2005/0160376 A1 * | 7/2005 | Sciammarella et al. ...... 715/838 |
| 2005/0163290 A1 | 7/2005 | Gilles et al. |
| 2005/0172001 A1 | 8/2005 | Zaner et al. |
| 2005/0182837 A1 | 8/2005 | Harris et al. |
| 2005/0209994 A1 | 9/2005 | Noro et al. |

| | | | |
|---|---|---|---|
| 2005/0210104 A1 | 9/2005 | Torvinen | |
| 2005/0229110 A1 | 10/2005 | Gegner et al. | |
| 2005/0235225 A1 | 10/2005 | Pradhan et al. | |
| 2005/0235226 A1 | 10/2005 | Watanabe et al. | |
| 2005/0235251 A1 | 10/2005 | Arend et al. | |
| 2005/0243979 A1 | 11/2005 | Starbuck et al. | |
| 2005/0245236 A1 | 11/2005 | Servi et al. | |
| 2005/0246654 A1 | 11/2005 | Hally et al. | |
| 2005/0261011 A1 | 11/2005 | Scott | |
| 2005/0261032 A1 | 11/2005 | Seo et al. | |
| 2005/0278652 A1 | 12/2005 | Scholz | |
| 2006/0009249 A1 | 1/2006 | Fu et al. | |
| 2006/0048076 A1* | 3/2006 | Vronay et al. | 715/850 |
| 2006/0055700 A1 | 3/2006 | Niles et al. | |
| 2006/0084410 A1 | 4/2006 | Sutaria et al. | |
| 2006/0101350 A1 | 5/2006 | Scott | |
| 2006/0123360 A1 | 6/2006 | Anwar et al. | |
| 2006/0141996 A1 | 6/2006 | Huh | |
| 2006/0143574 A1 | 6/2006 | Ito et al. | |
| 2006/0148499 A1 | 7/2006 | Chie | |
| 2006/0168539 A1 | 7/2006 | Hawkins et al. | |
| 2006/0174121 A1 | 8/2006 | Omae et al. | |
| 2006/0212829 A1 | 9/2006 | Yahiro et al. | |
| 2006/0242597 A1 | 10/2006 | Park | |
| 2006/0253787 A1 | 11/2006 | Fogg | |
| 2006/0293057 A1 | 12/2006 | Mazerski et al. | |
| 2007/0011617 A1 | 1/2007 | Akagawa et al. | |
| 2007/0027920 A1 | 2/2007 | Alvarado et al. | |
| 2007/0032267 A1 | 2/2007 | Haitani et al. | |
| 2007/0033540 A1 | 2/2007 | Bridges et al. | |
| 2007/0067738 A1 | 3/2007 | Flynt et al. | |
| 2007/0073874 A1 | 3/2007 | Moghaddam et al. | |
| 2007/0079246 A1* | 4/2007 | Morillon et al. | 715/741 |
| 2007/0118813 A1 | 5/2007 | Forstall et al. | |
| 2007/0129112 A1 | 6/2007 | Tarn | |
| 2007/0136687 A1* | 6/2007 | Pak | 715/811 |
| 2007/0162862 A1 | 7/2007 | Ogasawara et al. | |
| 2007/0174389 A1 | 7/2007 | Armstrong et al. | |
| 2007/0198947 A1 | 8/2007 | Cox et al. | |
| 2007/0226645 A1 | 9/2007 | Kongqiao et al. | |
| 2007/0250936 A1* | 10/2007 | Nakamura et al. | 726/27 |
| 2007/0268908 A1 | 11/2007 | Linkola et al. | |
| 2007/0271528 A1 | 11/2007 | Park et al. | |
| 2008/0022228 A1* | 1/2008 | Kwon et al. | 715/838 |
| 2008/0059570 A1 | 3/2008 | Bill | |
| 2008/0081653 A1 | 4/2008 | Mock et al. | |
| 2008/0086703 A1 | 4/2008 | Flynt et al. | |
| 2008/0111826 A1* | 5/2008 | Endrikhovski et al. | 345/582 |
| 2008/0122870 A1 | 5/2008 | Brodersen et al. | |
| 2008/0189627 A1* | 8/2008 | Nikitin et al. | 715/762 |
| 2008/0194934 A1 | 8/2008 | Ray et al. | |
| 2008/0215978 A1* | 9/2008 | Bamba | 715/713 |
| 2008/0235248 A1 | 9/2008 | Krantz et al. | |
| 2008/0256170 A1 | 10/2008 | Hayashi et al. | |
| 2008/0261569 A1 | 10/2008 | Britt et al. | |
| 2008/0263069 A1 | 10/2008 | Harris et al. | |
| 2008/0288612 A1 | 11/2008 | Kwon | |
| 2008/0288880 A1 | 11/2008 | Reponen et al. | |
| 2009/0040875 A1 | 2/2009 | Buzescu et al. | |
| 2009/0043847 A1 | 2/2009 | Laurila | |
| 2009/0077496 A1 | 3/2009 | Aravamudan et al. | |
| 2009/0164923 A1 | 6/2009 | Ovi | |
| 2009/0199120 A1 | 8/2009 | Baxter et al. | |
| 2009/0228513 A1 | 9/2009 | Tian | |
| 2010/0020953 A1 | 1/2010 | Lidstrom et al. | |
| 2010/0062753 A1 | 3/2010 | Wen et al. | |
| 2010/0094837 A1 | 4/2010 | O'Sullivan et al. | |
| 2010/0144331 A1 | 6/2010 | Koberg et al. | |
| 2010/0287504 A1 | 11/2010 | Vance et al. | |
| 2010/0333029 A1* | 12/2010 | Smith et al. | 715/834 |

FOREIGN PATENT DOCUMENTS

| | | |
|---|---|---|
| EP | 1246434 A1 | 10/2002 |
| EP | 1469374 A1 | 10/2004 |
| EP | 1482758 A1 | 12/2004 |
| EP | 1571808 | 9/2005 |
| EP | 1608190 A1 | 12/2005 |
| JP | 07-129363 | 5/1995 |
| JP | 08-123658 | 5/1996 |
| JP | 09-083630 | 3/1997 |
| JP | 09-311661 | 12/1997 |
| JP | H11-088496 | 3/1999 |
| JP | H11-327741 | 11/1999 |
| JP | 2000-259304 | 9/2000 |
| JP | 2000-348058 | 12/2000 |
| JP | 2002-009899 A | 1/2002 |
| JP | 2003/198705 | 7/2003 |
| JP | 2004-208217 | 7/2004 |
| JP | 2004-348601 | 12/2004 |
| JP | 2005-072958 | 3/2005 |
| JP | 3834039 B2 | 10/2006 |
| KR | 10-2002-0069964 A | 9/2002 |
| KR | 10-2004-0024967 A | 3/2004 |
| KR | 10-2005-0043148 A | 5/2005 |
| KR | 10-2006-0042808 A | 5/2005 |
| KR | 10-2007-0029009 A | 3/2007 |
| KR | 10-2008-0004127 A | 1/2008 |
| KR | 10-2008-0019614 A | 3/2008 |
| KR | 10-2008-0079716 A | 9/2008 |
| WO | WO 00/25501 | 5/2000 |
| WO | WO 03/044756 A1 | 5/2003 |
| WO | WO 03/062976 A1 | 7/2003 |
| WO | WO 2005/045799 | 5/2005 |
| WO | WO 2005/064441 | 7/2005 |
| WO | WO 2005/120112 A1 | 12/2005 |
| WO | WO 2006/016227 | 2/2006 |
| WO | WO 2006/067567 A1 | 6/2006 |
| WO | WO 2007/093997 A1 | 8/2007 |
| WO | WO 2008/030776 A2 | 3/2008 |

OTHER PUBLICATIONS

Boy Genius, *LG Xenon hitting AT&T before Christmas?*, http://www.boygeniusreport.com/2008/09/24/lg-xenon-hitting-att-before-christmas/, Sep. 24, 2008.

International Search Report (PCT/US2010/028894), Nov. 12, 2010.

International Search Report (PCT/US2010/028904), Nov. 8, 2010.

International Search Report (PCT/US2010/028905), Nov. 12, 2010.

International Search Report (PCT/US2010/028947), Nov. 12, 2010.

Internation Search Report PCT/US2007070475, Jun. 29, 2011.

Alltel Launches 'My Circle,' a One-of-a-Kind Program That Gives Customers Free Calls to Any Network or Number They Choose, Business Wire, Apr. 20, 2006, pp. 1, New York.

Alltel's 'My Circle' Plan Lets Subscribers Adds 10 Numbers for Unlimited Calls, Wireless News, Apr. 23, 2006, pp. 2, Coventry.

Cuneo, Alice Z., Alltel Gets Aggressive in Telecom War, Advertising Age, Apr. 24, 2006, vol. 77, Issue 17, pp. 8, 1 pg., Chicago (Midwest region edition).

International Search Report (PCT/US2010/028857), Oct. 11, 2010.

International Search Report (PCT/US2010/028863), Oct. 22, 2010.

International Search Report (PCT/US2010/028954), Oct. 27, 2010.

International Search Report (PCT/US2010/028960), Oct. 26, 2010.

European Search Report (PCT/US2006022645), Sep. 6, 2011.

Weisser, Cybele and Farnoosh Torabi. "What do you pay to stay connected?" Money Magazine, Nov. 24, 2003. http://money.cnn.com/2003/11/20/pf/portability_strategy_0312/index.htm.

International Preliminary Preport on Patentability in application No. PCT/US2010/028960 dated Sep. 27, 2011.

International Preliminary Report on Patentability in application No. PCT/2010/028863 mailed Sep. 27, 2011.

International Preliminary Report on Patentability in application No. PCT/US/2010/028904 mailed Sep. 27, 2011.

International Preliminary Report on Patentability in application No. PCT/US2010/028857 mailed Sep. 27, 2011.

International Preliminary Report on Patentability in application No. PCT/US2010/028894 mailed Sep. 27, 2011.

International Preliminary Report on Patentability in application No. PCT/US2010/028905 mailed on Sep. 27, 2011.

International Preliminary Report on Patentability in application No. PCT/US2010/028947 mailed Sep. 27, 2011.

International Preliminary Report on Patentability in application No. PCT/US2010/028954 mailed Sep. 27, 2011.
Second Office Action in Chinese Application No. 200680020479.9 mailed Mar. 22, 2012.
Office Action in R.O.C. Application No. 098304597 dated Dec. 15, 2011, in 4 pages.

"Alltel Corp at Lehman Brothers Worldwide Wireless, Wirelein, and Media Conference". Fair Disclosure Wire. May 22, 2006.
"Alltel's free wireless calling plan paying off", Virgil Larson, Knight Rider Tribune Business News, May 2005, 2 pages.

* cited by examiner

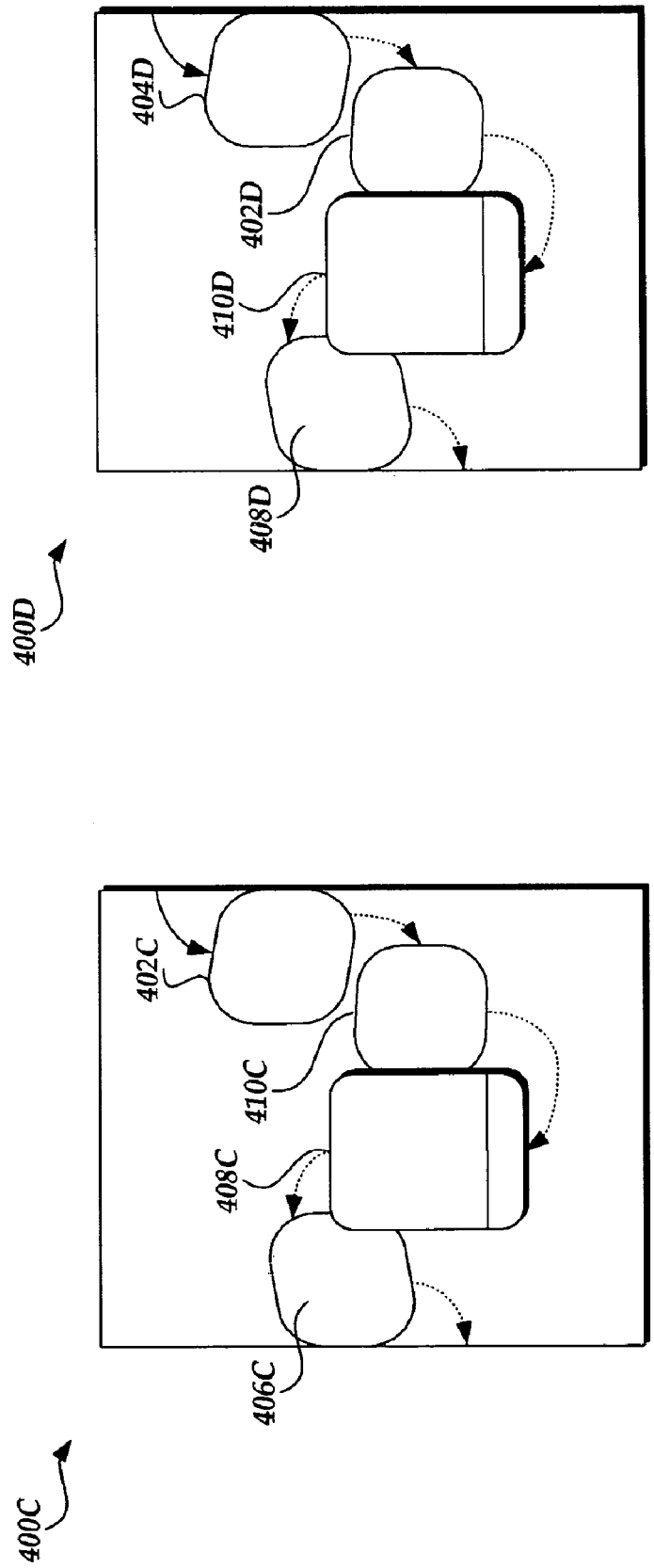

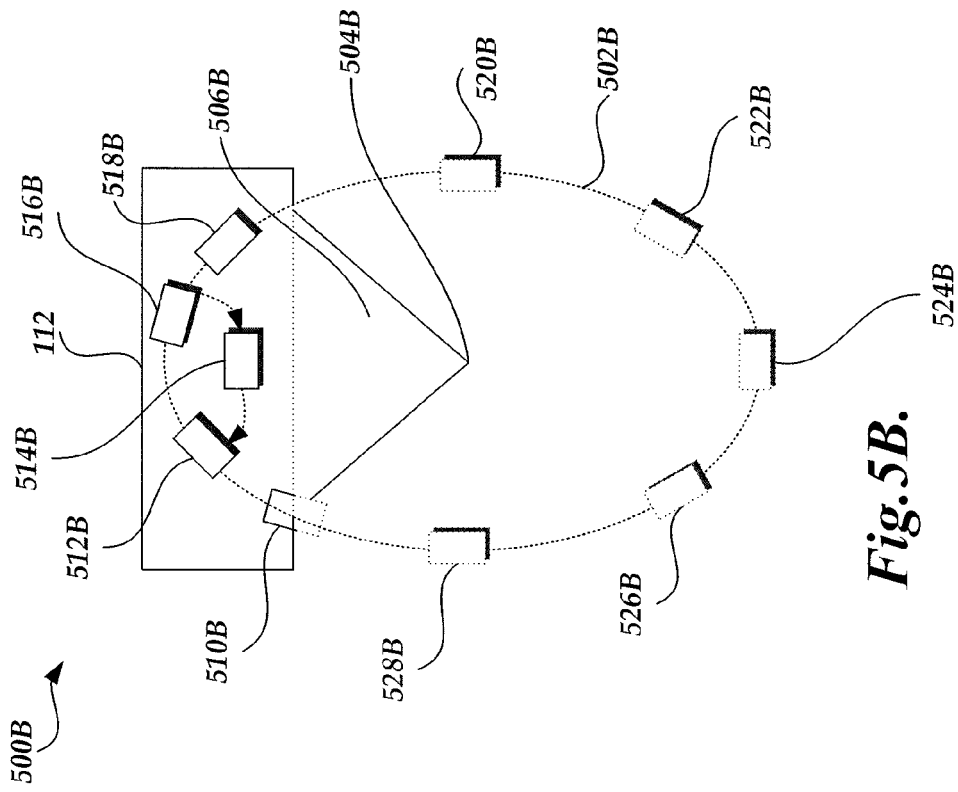
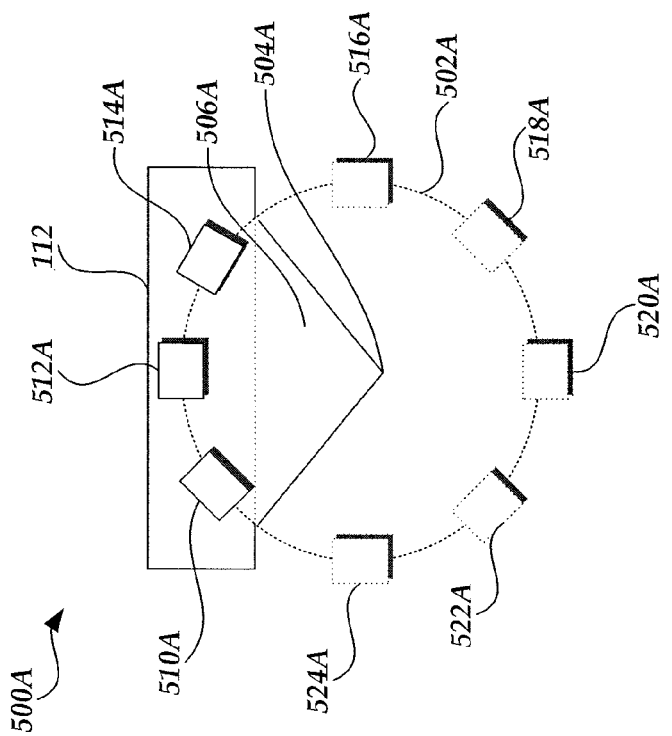
*Fig.5B.*
*Fig.5A.*

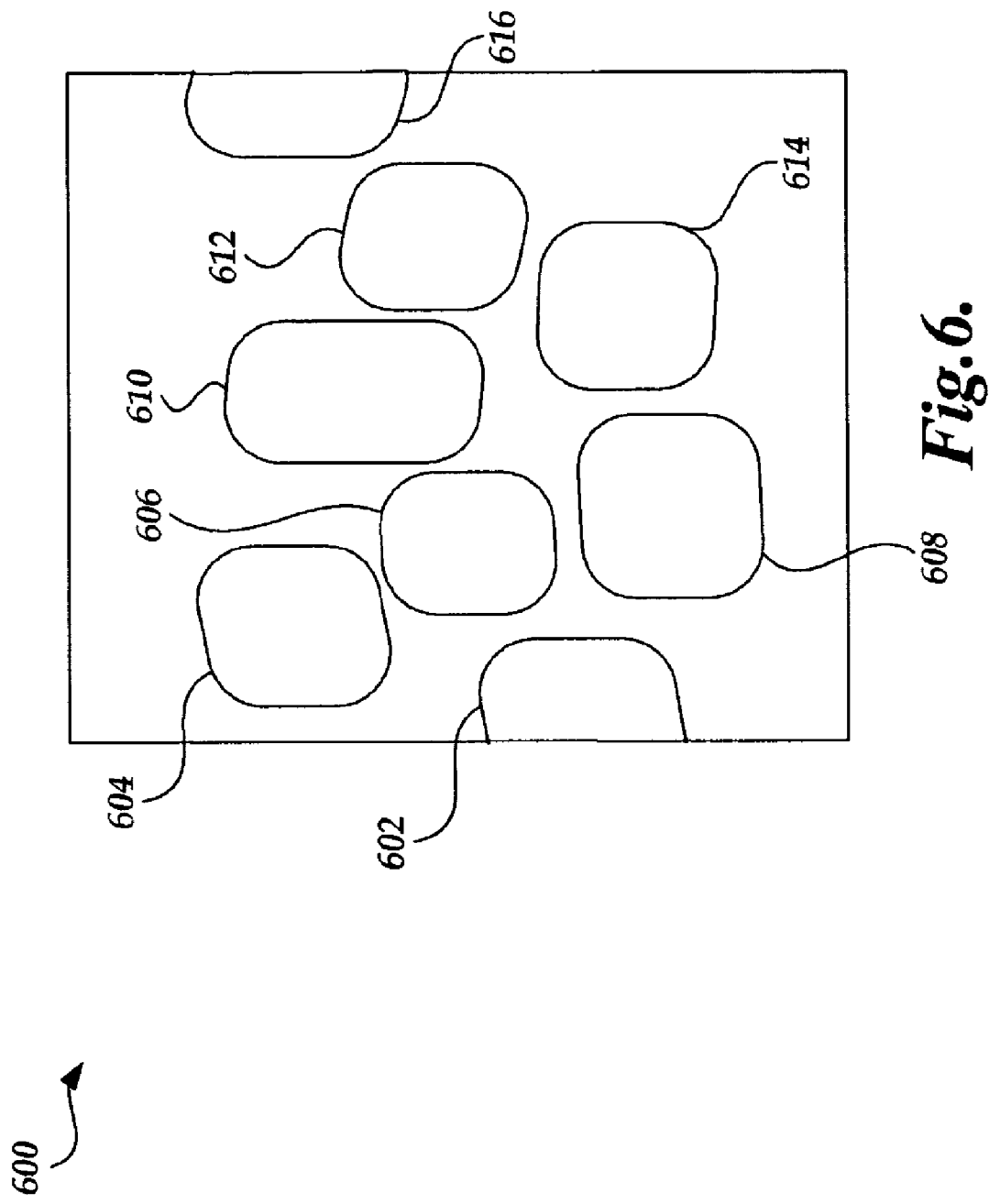

US 8,370,770 B2

VARIABLE PATH MANAGEMENT OF USER CONTACTS

CROSS-REFERENCE TO RELATED APPLICATION

This application is a continuation-in-part of U.S. Patent Publication No. 2007/0035513 A1 filed on Apr. 10, 2006 (and accorded U.S. application Ser. No. 11/400,925), entitled PREFERRED CONTACT GROUP INTERFACE, which in turn claims the benefit under 35 U.S.C. §119(e) of U.S. Provisional Patent Application No. 60/689,581 filed on Jun. 10, 2005, both of which are hereby incorporated by reference in their entirety.

BACKGROUND

Generally described, telecommunications devices and communication networks facilitate the collection and exchange of information. Utilizing a communication network and relevant communication protocols, a telecommunications device can engage in audio and/or data communications with other telecommunications devices, such as voice calls, video calls, messaging (e.g., short message service ("SMS") or multimedia messaging service ("MMS"), content streaming, instant messaging, resource browsing (e.g., Web browsing), and the like.

To facilitate communications, telecommunications devices can be associated with software and hardware components that allow the telecommunications device to maintain contact information, such as telephone numbers, email addresses, messaging addresses, etc., utilized to establish and engage in communications via available communication channels. Typically, such contact information is maintained as contact information in which all known contact information for an identified entity, such as user, can be presented to a telecommunications device user. For example, a telecommunications device may present a user interface in which the contact information associated with a selected individual is presented in a list-based format. In another example, a telecommunications device with voice calling capabilities may maintain a "last call list" that keeps track of telephone numbers of the most recent incoming calls to or outgoing calls from the telecommunications device.

Although contact management user interfaces and software can facilitate the input and management of contact information for a larger set of contacts, typical contact management approaches can become deficient as the set of entities associated with some contact information continues to grow. In one example, typical call list approaches are limited in the number of contacts identified in the user interfaces. Accordingly, such approaches can become deficient as the number of incoming or outgoing communications increases because potentially desired contacts are removed from the display based on order of the incoming or outgoing call. In another example, typical contact management approaches relate to the presentation of the entire set of contacts that are associated with a user. As the number of contacts maintained in the telecommunications device, or on behalf of the telecommunications device, grows, users may have increased difficulty in identifying the contact information of specific entities. Additionally, for each contact, the typical contact management approach identifies all known contact information (e.g., phone numbers, IM aliases, email addresses, etc.) without regard to a desired, or preferred, communication method.

In addition to the management of contact information accessible by a telecommunications device as described above, current approaches to manage such contact information are inefficient in the accessibility of select contact information and the establishment of options or actions that can be initiated by the telecommunications device user via a number of user interfaces.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 4A-4D are illustrative user interfaces displaying movement of graphical identifiers about an axis external to the telecommunications device;

FIGS. 5A and 5B are illustrative diagrams of a top perspective view of an axis relative to and external to a telecommunications device, as well as a perceived path about which a set of graphical identifiers appear to rotate;

FIG. 6 is an illustrative user interface displaying another embodiment of a set of graphical identifiers about an axis external to the telecommunications device;

DETAILED DESCRIPTION

Generally described, the present disclosure is directed to managing at least one subset of user contacts on a telecommunications device. Specifically, aspects of the disclosure will be described with regard to identifying a subset of contacts selected at least in part by a user of the telecommunications device and causing display of a graphical identifier associated with each contact of the subset of contacts in an arrangement on a display of the telecommunications device about an axis positioned external to the display of the telecommunications device. In one embodiment, the arrangement includes at least two paths each determined as a function of distance to the axis, and the graphical identifiers are caused to be located on the display in positions along the at least two paths. In another embodiment, an order associated with the user's selection of each contact as a member of the subset of contacts is determined, and each graphical identifier is positioned along either the first path or second path based on the order of the user's selection of the associated contact from the subset. In a further embodiment, the first and second paths are each selectable to facilitate communication with a contact positioned in the selected path. Other aspects of the disclosure will also be described herein with regard to additional multiple path arrangements and functionality associated with the graphical identifiers positioned along these paths.

Although aspects of the present disclosure will be described with regard to an illustrative telecommunications environment and component interactions, telecommunications protocols, flow diagrams, and user interfaces, one skilled in the relevant art will appreciate that the disclosed embodiments are illustrative in nature and should not be construed as limiting. Specifically, although the term telecommunications device is used in this document, the term represents any type of device having a component for communicating with one or more other devices via one or more communication paths. Such communication paths can include wireless communication paths (via infra-red, RF, optical, terrestrial, or satellite communication media) and wired communication paths.

Figure 1:
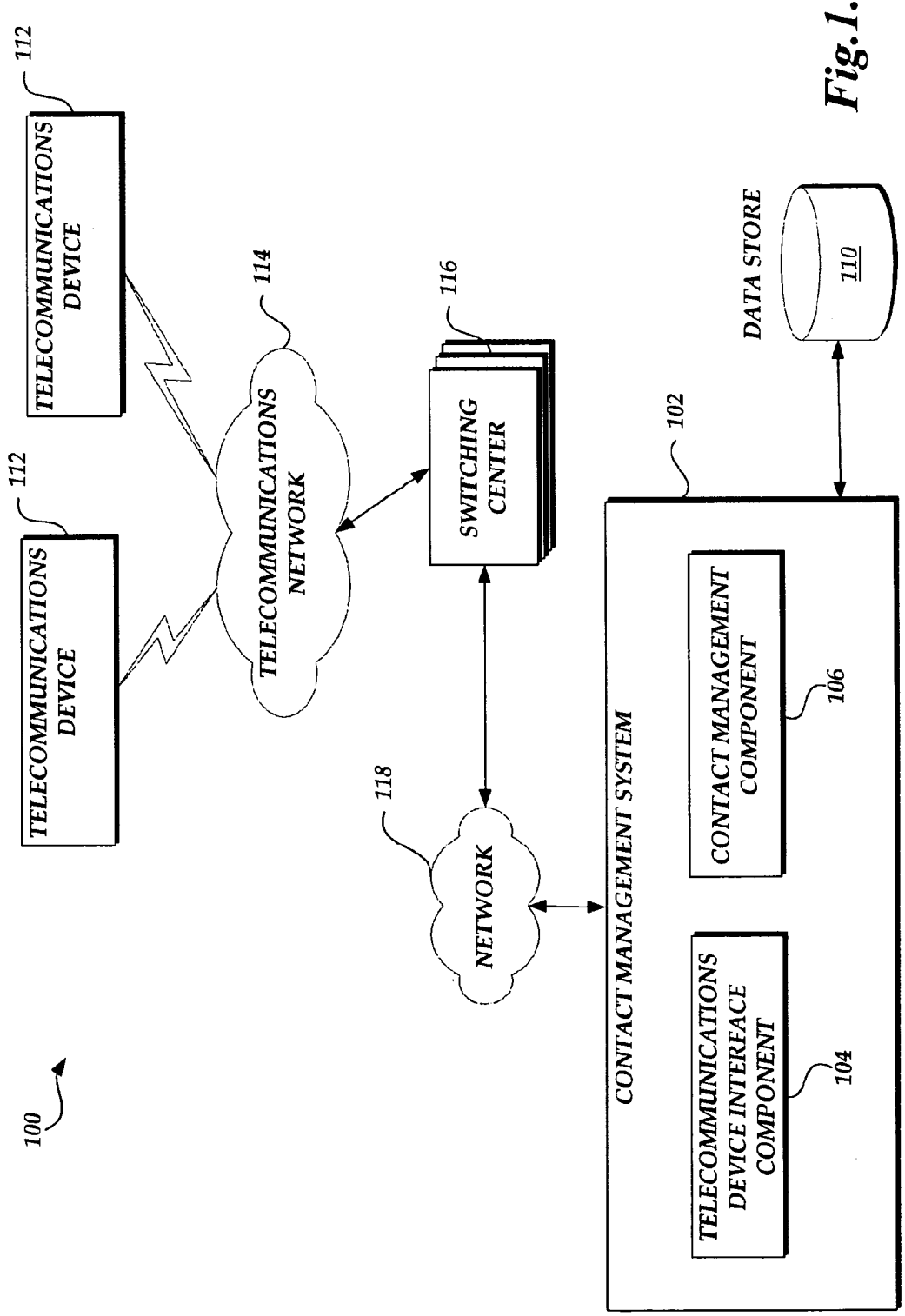
FIG. 1 is a block diagram illustrative of one embodiment of a telecommunications environment including a contact management system and a number of telecommunications devices.

With reference now to FIG. 1, a block diagram illustrative of a telecommunications environment 100 for managing at least one subset of user contacts will be described. The telecommunications environment 100 can include a contact management system 102. As illustrated in FIG. 1, the contact management system 102 can include a telecommunications device interface component 104 for establishing communications with a variety of telecommunications devices. In an illustrative embodiment, the telecommunications device interface component 104 corresponds to a bi-lateral interface for facilitating the transfer of data between telecommunications devices and the contact management system 102. In particular, in one embodiment, the telecommunications device interface component 104 obtains telecommunications device information and event information from a variety of telecommunications devices.

With continued reference to FIG. 1, the contact management system 102 can also include a contact management component 106 for processing the telecommunications device information and event information, particularly with respect to telecommunications device user contacts and communications therewith. The contact management component 106 can process this information to identify at least one subset of contacts selected at least in part by a user of a telecommunications device. In addition, the contact management component 106 can cause the display of a graphical identifier associated with each contact of the at least one subset of contacts in an arrangement on a display of the telecommunications device about an axis positioned external to the display of the telecommunications device. The contact management system 102 can further be associated with a contact management data store 110 for storing information obtained by the interface component 104 and/or utilized by the contact management component 106 as will be explained in greater detail below.

One skilled in the relevant art will appreciate that the contact management system 102 may correspond to a number of computer devices, such as server computing devices. Additionally, the telecommunications device interface component 104 and contact management component 106 may be implemented in a single computing device or across multiple computing devices. Likewise, although the contact management data store 110 is illustrated as local to the contact management system 102, the data store 110 can correspond to a distributed data store and/or network-based data store. One skilled in the relevant art will also appreciate that the contact management system 102 may include any one of a number of additional hardware and software components that would be utilized in the illustrative computerized network environment to carry out the illustrative functions of the system 102 and/or any of the individually identified components.

With continued reference to FIG. 1, the telecommunications environment 100 can include a number of telecommunications devices 112. The telecommunications devices 112 can correspond to a wide variety of devices or components that are capable of initiating, receiving, or facilitating communications over a communication network including, but not limited to, personal computing devices, hand held computing devices, integrated components for inclusion in computing devices, home electronics, appliances, vehicles, machinery, landline telephones, VoIP telephones, cordless telephones, cellular telephones, smart phones, modems, personal digital assistants, laptop computers, gaming devices, media players, and the like. In an illustrative embodiment, the telecommunications devices 112 include a wide variety of software and hardware components for establishing communications over one or more communication networks, including cellular telecommunication network 114, a wired telecommunication network (not shown) and/or an IP-based telecommunications network (not shown). Illustrative components of a telecommunications device 112 will be described in greater detail with regard to FIG. 2.

In an illustrative embodiment, the telecommunications environment 100 can include a number of additional components, systems, and/or subsystems for facilitating communications with the telecommunications devices 112 and/or the contact management system 102. The additional components can include one or more switches or switching centers 116 (in GSM embodiments, Mobile Switching Centers or MSCs) for establishing communications with the telecommunications devices 112 via the telecommunication network 114, such as a cellular radio access network, an IP-based telecommunications network based on the family of IEEE 802.11 technical standards ("WiFi") or IEEE 802.16 standards ("WiMax"), a converged wireless telecommunications network such as Unlicensed Mobile Access (UMA) or General Access Network (GAN), and other wired and wireless networks. The operation of telecommunication networks, such as telecommunication network 114 are well known and will not be described in greater detail. As illustrated in FIG. 1, the switching center 116 includes interfaces for establishing various communications via a communication network 118, such as the Internet, intranets, private networks and point to point networks, generally referred to as the "network." Although the telecommunication network 114 is illustrated as a single communication network, one skilled in the relevant art will appreciate that the communication network can be made up of any number of public or private communication networks and/or network connections.

Figure 2:
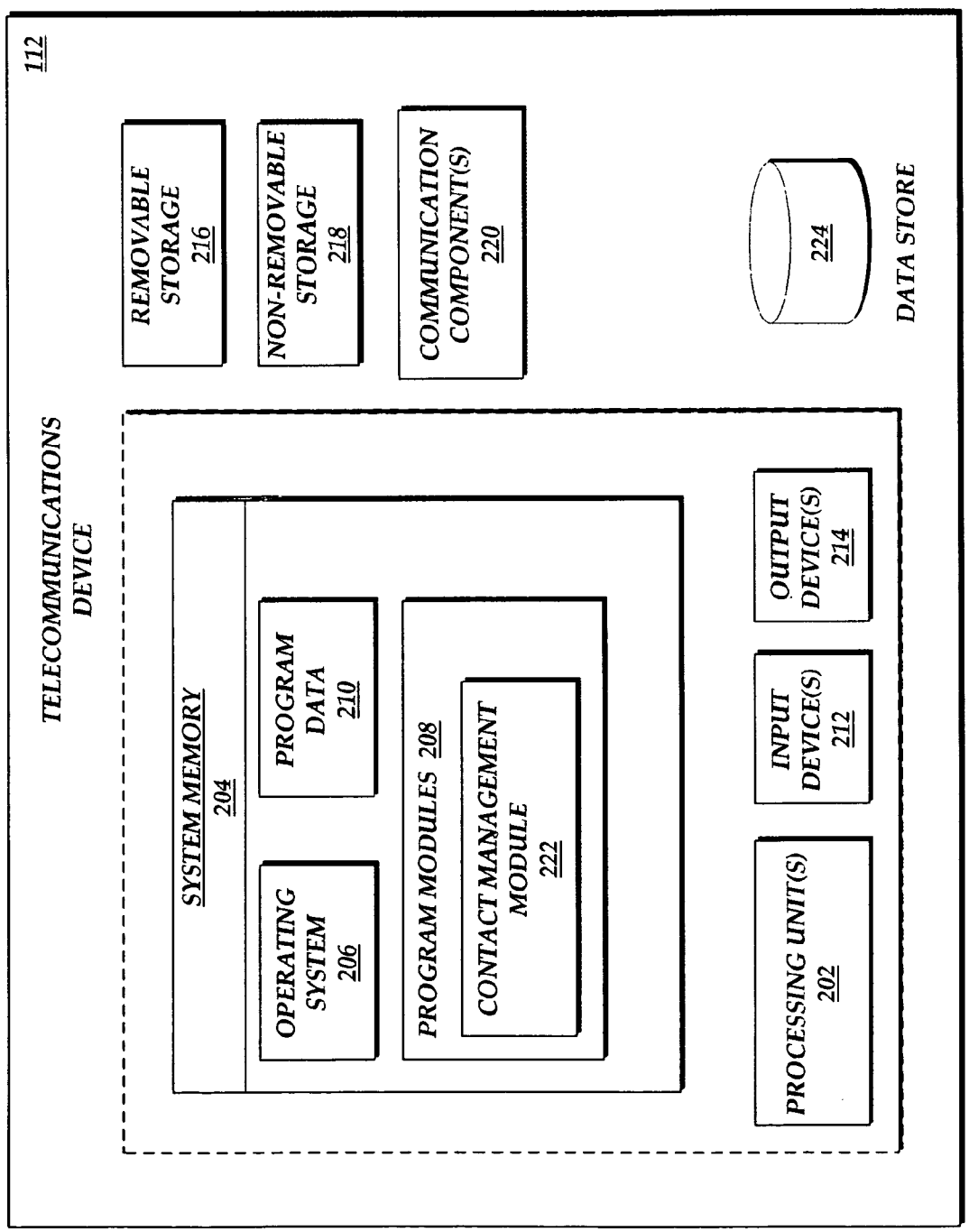
FIG. 2 is a block diagram illustrative of one embodiment of a telecommunications device depicted in FIG. 1.

With reference now to FIG. 2, illustrative components of a telecommunications device 112 for use in identifying at least one subset of user contacts and causing display of a graphical identifier associated with each contact of the at least one subset of contacts in an arrangement about an axis positioned external to a display of the telecommunications device will be described. The telecommunications device 112 may include one or more processing units 202, such as one or more CPUs.

The telecommunications device 112 may also include system memory 204, which may correspond to any combination of volatile and/or non-volatile storage mechanisms. The system memory 204 may store information which provides an operating system component 206, various program modules 208, program data 210, and/or other components. The telecommunications device 112 performs functions by using the processing unit(s) 202 to execute instructions provided by the system memory 204. The telecommunications device 112 may also include one or more input devices 212 (keyboard, mouse device, specialized selection keys, etc.) and one or more output devices 214 (displays, printers, audio output mechanisms, etc.). Illustrative screen renderings for a telecommunications device 112 will be described with regard to FIGS. 4A-4D and FIG. 6 below.

With continued reference to FIG. 2, the telecommunications device 112 may also include one or more types of removable storage 216 and one or more types of non-removable storage 218. Still further, the telecommunications device 112 can include communication components 220 for facilitating communication via wired and wireless telecommunications networks, such as telecommunications network 114 and network 118 (FIG. 1). In an illustrative embodiment, the communication components 220 can facilitate the bi-lateral transfer of data between the telecommunications device 112 and the contact management system 102 (FIG. 1). Examples of various communication protocols include, but are not limited to, Bluetooth, the family of IEEE 802.11 technical standards ("WiFi"), the IEEE 802.16 standards ("WiMax"), short message service ("SMS"), voice over IP ("VoIP") as well as various generation cellular air interface protocols (including, but not limited to, air interface protocols based on CDMA, TDMA, GSM, WCDMA, CDMA2000, TD-SCDMA, WTDMA, LTE, OFDMA, and similar technologies).

As will be explained in greater detail below, the program modules 208 of the telecommunications device 112 can specifically include a contact management module 222. The telecommunications device 112 can use the contact management module 222 and an associated data store 224 for identifying at least one subset of contacts selected at least in part by a user of the telecommunications device 112 and causing the display of a graphical identifier associated with each contact of the at least one subset of contacts in an arrangement on a display of the telecommunications device 112 about an axis positioned external to the display of the telecommunications device 112. It will be appreciated by one skilled in the art that the foregoing functions as well as additional contact management functions, as will be described further below in reference to FIG. 3, may be implemented through execution of the contact management module 222 of the telecommunications device 112 alone or in combination with use of the contact management component 106 of the system 102 (FIG. 1). Accordingly, in some embodiments, the contact management module 222 of the telecommunications device 112 may further be operative to generate requests to the contact management system 102 for a set of data or to provide user contact information to the contact management system 102 based on determination of a communication event, a telecommunications device event, and/or a user event.

In one illustrative embodiment, a communication event may correspond to a communication between a user and a contact via the telecommunications device 112. In this embodiment, the contact management module 222 may provide information regarding the communication event to the contact management system 102 for purposes of tracking a frequency of communications between the user and the contact. In other illustrative embodiments, a telecommunications device event may correspond to an anticipated display of an idle screen, or a user event may correspond to selection of an input requesting a home page. In these embodiments, the contact management module 222 of the telecommunications device 112 may request information from the contact management system 102 necessary to cause the display of graphical identifiers associated with at least one subset of user-selected contacts in an arrangement about an axis positioned external to the display of the telecommunications device 112 as further described below.

The above-identified modules are representative and are not exhaustive of the types of functions performed, or modules implemented, by the telecommunications device 112. One skilled in the relevant art will appreciate that additional or alternative components may also be included in the telecommunications device 112 to carry out other intended functions.

Figure 3:
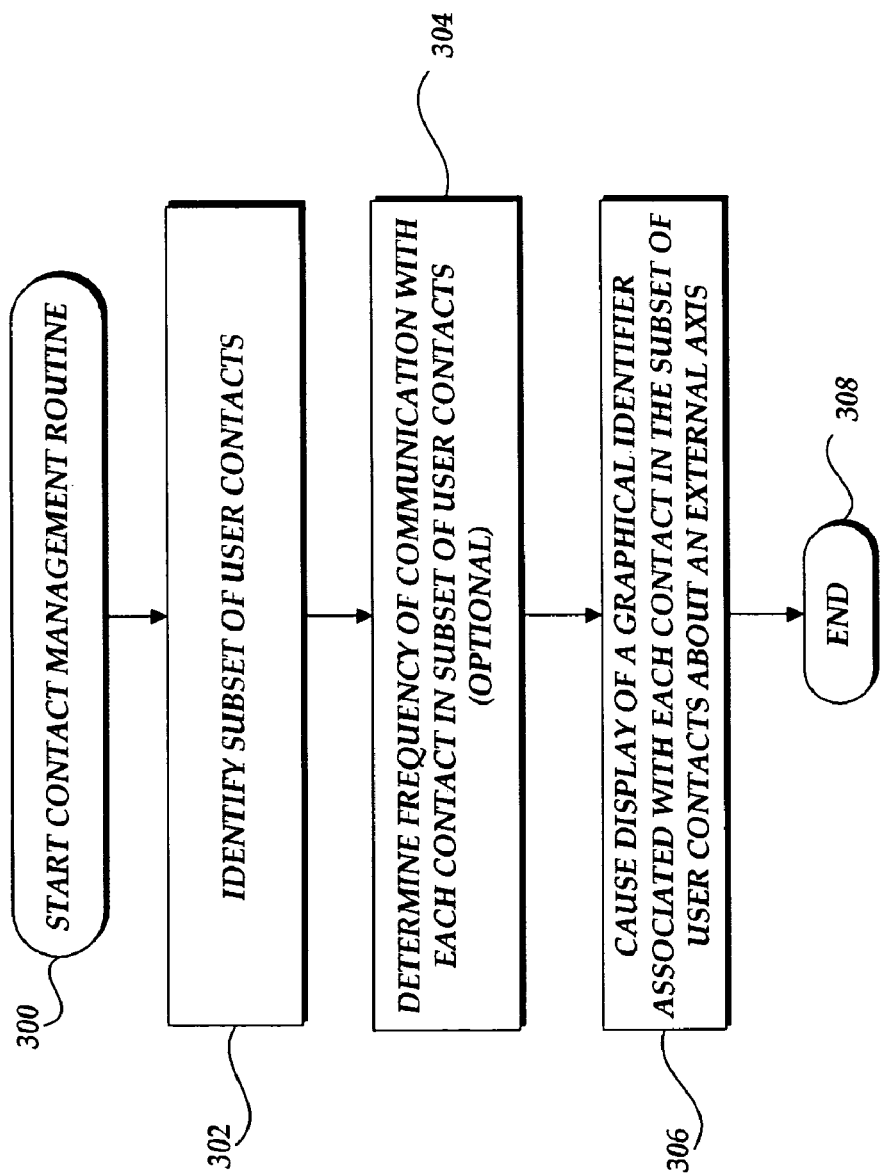
FIG. 3 is a flow diagram illustrative of a contact management routine implemented by a telecommunications device and/or within the telecommunications environment of FIG. 1 for managing a subset of user contacts for display on a telecommunications device.

With reference now to FIG. 3, one embodiment of a contact management routine 300 implemented by the contact management module 222 of the telecommunications device 112 either alone or in conjunction with the contact management component 106 of the contact management system 102 will be described. One skilled in the relevant art will appreciate that actions/steps outlined for routine 300 may be implemented by one or many computing devices/components that are associated with the telecommunications environment 100. Accordingly, routine 300 will be described as being generally performed by the contact management module 222. However, any functionality described in reference to the routine 300 could be generally performed by any component in the telecommunications environment 100. Thus, the following illustrative embodiments should not be construed as limiting.

At block 302, a contact management module 222 of a telecommunications device 112 identifies a subset of user contacts from a set of user contacts. A user contact may correspond to an individual person, an identifier associated with a person such as a telephone number, a group of people, an identifier associated with a group of people, and the like. In some embodiments, the set of user contacts from which the subset is identified is not limited and, in others, it may be limited such that only those contacts that the device has access to without requiring further input by user are included in the set. In other embodiments, the set from which the subset is identified may be further limited to contacts known to the user, contacts identified in one or more electronic address books, contacts having user-specified characteristics, and the like.

Additionally, in one illustrative embodiment, the subset of contacts can be selected by the user and subsequently maintained, for example, in data store 224 of the telecommunications device 112 for future identification and access by the contact management module 222.

In another embodiment, a portion of the subset of contacts can be selected by the user of the telecommunications device 112, while a second portion or a remaining portion of the subset of contacts are selected automatically based on one or more other factors. In one example, the factor can be a frequency of communication between the user and one or more user contacts accessible by the telecommunications device 112. In this example, the contact management module 222 monitors communications between the user and each of the user's contacts accessible by the telecommunications device 112 and maintains data associated with the monitored communications. Based on the monitored communications and corresponding maintained data, the contact management module 222 may determine a frequency of communication between the user and each of the user's contacts. This information can then be used to determine the second portion or the remaining portion of the subset of contacts. In one illustrative embodiment, the remaining portion of the subset of contacts can be selected based on the user contacts that have been in communication with the user the most number of times. In other embodiments, the contact management module 222 may track the types of communications between the user and the user's contacts, such as SMS messages, MMS messages, emails, voice calls, and the like, and then select the remaining portion of the subset of contacts based on the frequency of one type of communication or an aggregation of some or all types of communications. In addition, if aggregated, one type of communication can be weighted over other types. Even further, in other embodiments, the contact management module 222 may track only those communications initiated by the user to select the remaining portion of the subset of contacts based on the user's frequency of initiating communication with each of the user's contacts. Yet further, the contact management module 222 may track the frequency of communication between the user and each of the user's contacts for any period of time.

Additionally or alternatively, in a further embodiment, the identified subset of user contacts can be associated with a special rate plan offered by a telecommunications carrier providing communication services to the telecommunications device 112. Specifically, the user may be provided a special rate associated with any communications made between the user and any of the contacts identified in the subset. In addition to a special rate, the rate plan may have a variety of other parameters that may affect selection of the contacts to be included in the subset. For example, in one embodiment, the subset of contacts may be limited in number to correspond to a number of contacts with whom communications will be provided at a special rate. As another example, the subset of contacts may be editable only after a specified period of time has elapsed from initial selection (whether by the user or partially by automated selection based on other factors such as frequency of communication information).

With continued reference to FIG. 3, at block 304, the contact management module 222 optionally determines a frequency of communication between the user and each contact identified in the at least one subset of user contacts. As will be described further below, in some embodiments, this frequency of communication information can be used to determine a size corresponding to a graphical identifier associated with each contact in the at least one subset of user contacts and displayed on the telecommunications device 112. Additionally or alternatively, as will also be further described below, the frequency of communication information can be used in some embodiments to determine a position on the display of the telecommunications device 112 in which each such graphical identifier is located. Accordingly, in these embodiments, and as similarly described above with respect to embodiments where a portion of the user contacts in the at least one subset are selected based on frequency of communication information, the contact management module 222 monitors communications between the user and each user contact identified in the at least one subset and maintains data associated with the monitored communications. The contact management module 222 can then use this data to make the determination at block 304 as set forth above.

It will be appreciated by those skilled in the art and others that the determination at block 304 is optional in some embodiments. For example, the determination at block 304 is optional in embodiments in which characteristics of graphical identifiers associated with the at least one subset of user contacts are not based on frequency of communication information as will be further described below.

Next, at a block 306, the contact management module 222 of the telecommunications device 112 causes display of a graphical identifier associated with each contact identified in the at least one subset of contacts in an arrangement on a display of the telecommunications device 112 about an axis positioned external to the display of the telecommunications device 112. In an illustrative embodiment, the arrangement includes a path about the axis. In this embodiment, at least a portion of the graphical identifiers are caused to be located on the display in positions along the path. The positioning of the graphical identifiers along the path about the external axis facilitates a perception that the user of the telecommunications device 112, who is positioned at, or in proximity to, the external axis, is surrounded by the graphical identifiers or, even further, that the graphical identifiers are rotatable along the path about the external axis. In fact, in one embodiment, although not illustrated in FIG. 3, in response to a user navigation input on the telecommunications device 112, the contact management module 222 further causes the graphical identifiers associated with the subset of contacts to emulate rotation along the path about the external axis. The user navigation input can correspond to a variety of user inputs that provide directional commands for causing movement of the displayed graphical identifiers along at least a portion of the path. Such directional commands can be provided by a user through input devices associated with the telecommunications devices 112 such as manipulation of a track ball, voice recognition components, vision recognition components, a stylist, a touch screen, one or more keys, sliders, and the like. The routine 300 ends at block 308.

The following paragraphs provide other possible illustrative use cases, including various embodiments regarding how the contact management module 222 manages contacts, causes display of graphical identifiers associated with at least one subset of user contacts, and provides additional functionality in response to user inputs or event data.

In a further illustrative embodiment, the path about the external axis can be determined as a function of distance from the axis. This distance can be constant or variable. Accordingly, the path can correspond to any of a number of geometrically shaped paths, such as circular, elliptical, pentagonal, hexagonal, and the like. In some embodiments, the external axis may be a center axis relative to the path about which the graphical identifiers emulate rotation. In other embodiments, the external axis may be off center. In yet other embodiments, the path may be a curvilinear geometric-shaped path, such as a cylindrical path, an elliptic cylinder-shaped path, a prism-shaped path, and the like, defined as a function of distance to the axis for each plane intersecting the axis.

In another illustrative embodiment, the arrangement about the external axis can include a focal position and a number of other remaining non-focal positions in which the graphical identifiers associated with the subset of contacts can be located on the display. A graphical identifier located in the focal position can be emphasized or otherwise distinguished from the graphical identifiers located in any of the other remaining non-focal positions. In one example, the graphical identifier located in the focal position can be highlighted such that the entire graphical identifier or any portion thereof is highlighted. The highlighted portion may correspond to a perimeter or outline of the graphical identifier. In another example, each graphical identifier located in a position other than the focal position can be faded relative to the graphical identifier located in the focal position. In yet another example, the graphical identifier located in the focal position can have dimensions greater than the graphical identifiers displayed in the other remaining non-focal positions on the display of the telecommunications device 112. In a yet further example, the focal position may be offset from the non-focal positions such that a graphical identifier located in the focal position appears to be presented closer to a user of the telecommunications device. In this example, the non-focal position may be located in a path about the axis, whereas the focal position is not. Instead, the focal position is located a shorter distance from the external axis than the non-focal positions to emulate a closeness to the user and to thus bring the graphical identifier in the focal position into a forefront of the display.

In yet another embodiment, a graphical identifier located in the focal position is selectable to initiate communication between the user of the telecommunications device 112 and the contact associated with the respective graphical identifier. In one embodiment, by movement of a graphical identifier into the focal position in response to a user navigation input, the graphical identifier becomes selectable to initiate communication between the user and the contact associated with this graphical identifier. A graphical identifier can move into the focal position in response to a user navigation input in a number of ways. For example, in a touch screen environment, a user can select any graphical identifier which is presented on the display and which is positioned along the path about the external axis by touching the graphical identifier, thereby causing the selected graphical identifier to move into the focal position on the display. In another example, in response to a user navigation input (such as any of those set forth above), a user can cause a graphical identifier to rotate into the focal position.

In another embodiment, the contact management module 222 can determine user preferences for communication with each of the contacts such that when a graphical identifier is, for example, moved into the focal position on the display, the user may provide a single input to the telecommunications device to cause the contact management module 222 to initiate communication with the corresponding user contact in accordance with a predetermined mode of communication selected by the user with respect to that contact. Moreover, in addition or alternatively, in other embodiments, when a contact is located in the focal position or is otherwise emphasized or selected, the contact management module 222 can provide a communication screen for selecting any one or more identified types of communication with a contact in response to a single input received by the telecommunications device 112. The types of communication can include, for example, a voice call, an SMS text message, an MMS multimedia message, an email, an instant message, and the like.

In a still further embodiment, the graphical identifiers located in non-focal positions can be located in the path about the axis, while the graphical identifier located in the focal position is not located in the same path. This embodiment will be described further below in reference to FIGS. 4A-4D and FIG. 5B.

In another embodiment, the contact management module 222 can determine a size of any one or more of the graphical identifiers for display on the telecommunications device in the arrangement about the external axis. In one example, size determinations may be made for each graphical identifier presented on the display of the telecommunications device. Alternatively, size determinations may be made for a portion of the graphical identifiers, such as only those graphical identifiers located in positions other than a determined focal position as described above. In any of these examples, the size of the graphical identifiers can be determined to be constant or variable. Alternatively, the size may be based on one or more other factors. For example, the size may be determined as a function of the frequency of communication between the user and one or more contacts in the subset associated with a respective graphical icon (determined at block 304 of FIG. 3). Specifically, in one instance, as the frequency of communication with a contact increases, the dimensions of the respective graphical identifier on the display of the telecommunications device 112 will correspondingly become greater. In another example, the size of at least a portion of the graphical identifiers associated with the subset of contacts may be determined as a function of the rotation about the external axis.

In a further embodiment, the contact management module 222 can determine an initial position on the display for one or more graphical identifiers as a function of the frequency of communication between the user and the contact associated with the respective graphical identifier. Alternatively, the initial position of the graphical identifiers on the display can be based on an order in which the user selected the corresponding contact to be a member of the subset of contacts. In this example, where the arrangement includes a focal position and other non-focal positions, the graphical identifier associated with the contact selected by the user as the first member, or otherwise as the most important member, of the subset of contacts can be initially located in the focal position on the display of the telecommunications device 112. In another embodiment, the initial position of each graphical identifier on the display can be determined as a function of user selection. In this case, a user can specifically identify a contact (and/or its associated graphical identifier) to be associated with a particular initial position on the display.

In a yet further embodiment, the contact management module 222 can determine that the positions of each of the graphical identifiers in the arrangement about the external axis should be staggered. In this embodiment, each graphical identifier associated with a contact in the subset of contacts is vertically and horizontally displaced from an adjacent graphical identifier on the display. In addition or alternatively, the contact management module 222 can cause each graphical identifier associated with a contact in the subset of contacts to be separated on the display by a minimum distance. Again, additionally or alternatively, the contact management module 222 can cause adjacent graphical identifiers to be separated on the display by variable distances, but in some embodiments such variable distances are within a predetermined range of distances.

In any of the foregoing embodiments, the contact management module 222 of the telecommunications device 112 can cause the display of an arrangement of graphical identifiers associated with the subset of user contacts about an external axis on a home page or idle screen of the telecommunications device. Accordingly, in response to or in anticipation of an idle event or a home page initiation event, the contact management module 222 determines that an idle screen or a home page screen, respectively, is to be displayed on the telecommunications device.

With reference now to FIGS. 4A-4D, one embodiment of a set of illustrative user interfaces generated by the telecommunications device 112 for displaying movement of a set of graphical identifiers about an axis external to the telecommunications device 112 is provided. In this embodiment, as will be further described below, graphical identifiers 402, 404, 406, 408, and 410 are associated with respective contacts from a subset of contacts selected by a user of the telecommunications device 112. Accordingly, in this embodiment, the subset of contacts comprises five user selected contacts. As will also be further described below, at least a portion of the graphical identifiers 402, 404, 406, 408, 410 are displayed at any given time on the display of the telecommunications device 112. The graphical identifiers 402, 404, 406, 408, 410 are positioned in an arrangement about an axis which is located external to the display of the telecommunications device 112. The arrangement, in this embodiment, further includes a focal position and a set of three remaining non-focal positions in which a graphical identifier is located. Accordingly, at any given time, one of the graphical identifiers is not displayed in the user interface. In addition, the arrangement includes a path determined as a function of distance to the axis.

As best illustrated in reference to FIGS. 4A-4D, at least a portion of the graphical identifiers 402, 404, 406, 408, and 410 emulate rotation along the path in response to a user navigation input. In particular, in this embodiment, the non-focal positions are located in the path about the axis, whereas the focal position is not. The focal position, in this embodiment, is offset from the non-focal positions such that a graphical identifier located in the focal position appears to be presented closer to a user of the telecommunications device. As will also best illustrated in reference to FIGS. 4A-4D, while the focal position is not located in the path including the non-focal positions, each of the graphical identifiers displayed in the user interface emulate rotation about the external axis.

Figure 4B:
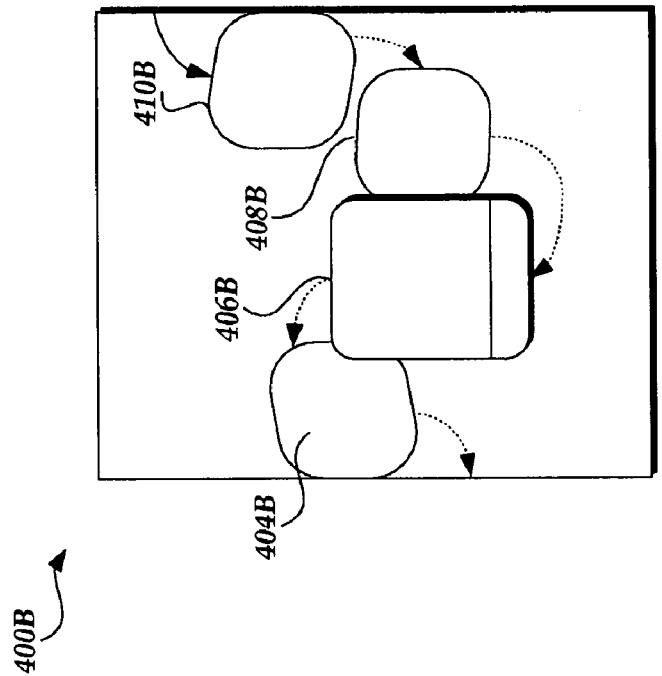
Figure 4A:
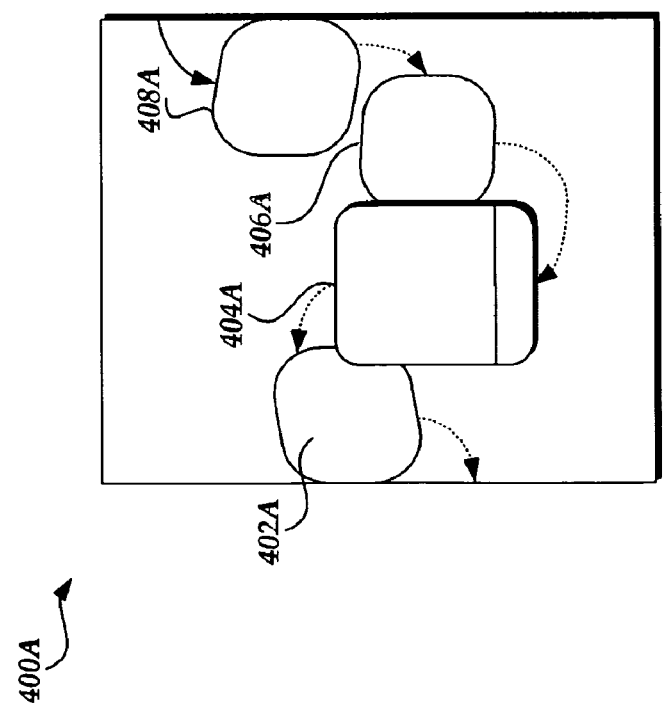

With reference now to FIG. 4A in particular, an illustrative user interface 400A generated by the telecommunications device 112 for displaying at least a portion of the graphical identifiers 402, 404, 406, 408, 410 in an arrangement about an external axis is provided. In this embodiment, the user interface 400A displays four of the graphical identifiers 402A, 404A, 406A, and 408A. The graphical identifiers 402A, 406A, and 408A are located in non-focal positions along the path about the external axis, while the graphical identifier 404A is located in the focal position. The arrows within the user interface 400A are provided for illustration purposes only in order to demonstrate the next position that the graphical identifier will move in response to a user navigation input.

With reference now to FIG. 4B, an illustrative user interface 400B generated by the telecommunications device 112 in response to a first user navigation input received after display of the user interface 400A (FIG. 4A) is provided. In accordance with the present embodiment, the user interface 400B now displays a different set of four graphical identifiers 404B, 406B, 408B, and 410B. Specifically, in response to the first user navigation input, the graphical identifiers shift about the external axis. Accordingly, the graphical identifier 402 appears to have rotated off the display and is no longer shown in FIG. 4B, while graphical identifier 410B has rotated onto the display into the non-focal position in which graphical identifier 408A was previously located (FIG. 4A). Similarly, graphical identifiers 404B, 406B, and 408B have also rotated about the external axis in accordance with the illustrative arrows provided in FIG. 4A forecasting the movement of the graphical identifiers. Accordingly, graphical identifier 406B has now moved into the focal position and, thus, is now selectable by the user so as to initiate communication with the associated contact.

With reference now to FIG. 4C, an illustrative user interface 400C generated by the telecommunications device 112 is provided. The illustrative user interface 400C is provided in response to a second user navigation input received by the telecommunications device 112 but initially provided after display of the user interface 400B (FIG. 4B). In accordance with the present embodiment, the user interface 400C now displays a different set of four graphical identifiers 406C, 408C, 410C, and 402C. Specifically, in response to the second user navigation input, the graphical identifiers continue to shift about the external axis. Accordingly, the graphical identifier 404 now appears to have rotated off the display and is no longer shown in FIG. 4C, while graphical identifier 402C has rotated back onto the display into the non-focal position in which graphical identifier 410B was previously located (FIG. 4B). Similarly, graphical identifiers 406C, 408C, and 410C have also rotated about the external axis in accordance with the illustrative arrows provided in FIG. 4B forecasting the movement of the graphical identifiers. Accordingly, graphical identifier 408C has now moved into the focal position and, thus, is now selectable by the user so as to initiate communication with the associated contact.

With reference now to FIG. 4D, an illustrative user interface 400D generated by the telecommunications device 112 is provided. The illustrative user interface 400D is provided in response to a third user navigation input received by the telecommunications device 112 but initially provided after display of the user interface 400C (FIG. 4C). In accordance with the present embodiment, the user interface 400D now displays a different set of four graphical identifiers 408D, 410D, 402D, and 404D. Specifically, in response to the third user navigation input, the graphical identifiers continue to shift about the external axis. Accordingly, the graphical identifier 406 now appears to have rotated off the display and is no longer shown in FIG. 4D, while graphical identifier 404D has rotated back onto the display into the non-focal position in which graphical identifier 402C was previously located (FIG. 4C). Similarly, graphical identifiers 408D, 410D, and 402D have also rotated about the external axis in accordance with the illustrative arrows provided in FIG. 4C forecasting the movement of the graphical identifiers. Accordingly, graphical identifier 410D has now moved into the focal position and, thus, is now selectable by the user so as to initiate communication with the associated contact.

As also shown in the illustrative embodiment depicted with respect to FIGS. 4A-4D, the graphical identifiers 402, 404, 406, 410, 412 are staggered in the user interface 400. Specifically, each graphical identifier associated with a contact in the subset of contacts is vertically and horizontally displaced from an adjacent graphical identifier in the user interface 400. Additionally, the graphical identifiers are separated in the user interface 400 such that graphical identifiers do not share any common borders.

With reference now to FIGS. 5A and 5B, illustrative embodiments of a top perspective view of an axis relative to and external to a telecommunications device, as well as a perceived path about which a set of graphical identifiers appear to rotate, are provided. As set forth throughout this description, each of the graphical identifiers corresponds to a contact of the at least one subset of user contacts. With reference specifically to FIG. 5A, a top perspective view 500A illustrates a circular path 502A along which a set of graphical identifiers 510A, 512A, 514A, 516A, 518A, 520A, 522A, 524A emulate rotation about an axis 504A. The axis 504A is positioned external to a telecommunications device 112 and, for a user located at the axis 504A, defines the vertex of a field of view 506A relative to a display of the telecommunications device 112. The graphical identifiers in positions along the path 502A which intersect with the telecommunications device 112 are displayed in a user interface. Upon receipt of one or more user navigation inputs, the graphical identifiers 510A, 512A, 514A, 516A, 518A, 520A, 522A, 524A emulate rotation along the path 502A about the axis 504A. Accordingly, in this embodiment, a portion of the graphical identifiers 510A, 512A, 514A are presented on the display of the telecommunications device, while a remaining portion of the graphical identifiers 516A, 518A, 520A, 522A, 524A are illustrated in phantom along the path 502A to demonstrate the emulated rotation. The graphical identifiers that can be seen by a user in the field of view 506A thus appear to rotate along a portion of the path 502A about the external axis 504A.

With reference now to FIG. 5B, in another embodiment, a top perspective view 500B is provided illustrating an oval path 502B along which a set of graphical identifiers 510B, 512B, 514B, 516B, 518B, 520B, 522B, 524B, 526B, 528B emulate rotation about an axis 504B. The axis 504B is positioned external to a telecommunications device 112 and, for a user located at the axis 504B, defines the vertex of a field of view 506B relative to a display of the telecommunications device 112. In this embodiment, the graphical identifiers in non-focal positions located along the path 502B which intersect with the telecommunications device 112, as well as a graphical identifier located in a focal position, are displayed in a user interface. Upon receipt of one or more user navigation inputs, the graphical identifiers 510B, 512B, 514B, 516B, 518B, 520B, 522B, 524B, 526B, 528B emulate rotation about the axis 504B. Additionally, the graphical identifiers in non-focal positions (510B, 512B, 516B, 518B, 520B, 522B, 524B, 526B, 528B as illustrated in FIG. 5B) emulate rotation along the path 502B about the axis 504B with a deviation being made for the graphical identifier 514B located in the focal position as demonstrated by the arrows in FIG. 5B.

As similarly described with respect to the embodiment illustrated in FIG. 5A, a portion of the graphical identifiers 510B, 512B, 514B, 516B, 518B in this embodiment are presented on the display of the telecommunications device 112, while a remaining portion of the graphical identifiers 520B, 522B, 524B, 526B, 528B are illustrated in phantom along the path 502B to demonstrate the emulated rotation. The graphical identifiers that can be seen by a user in the field of view 506B thus appear to rotate along at least a portion of the path 502B about the external axis 504B. Moreover, as illustrated in FIG. 5B, a portion of a single graphical identifier, such as graphical identifier 510B, can presented on the display to emulate that the graphical identifier's transition on or off the screen as rotation about the axis 504 is emulated.

With reference now to FIG. 6, another embodiment of an illustrative user interface 600 generated by the telecommunications device 112 is provided. The illustrative user interface 600 displays a set of graphical identifiers 602, 604, 606, 608, 610, 612, 614, 616 in an arrangement about an axis which is external to the telecommunications device 112. Again, each of the graphical identifiers 602, 604, 606, 608, 610, 612, 614, 616 in the set corresponds to a contact in a subset of user contacts as similarly described above. In this embodiment, the graphical identifiers 602, 604, 606, 608, 610, 612, 614, 616 are presented in a staggered format on a display of the telecommunications device along a path about an axis which is external to the telecommunications device 112. Specifically, each graphical identifier 602, 604, 606, 608, 610, 612, 614, 616 is vertically and horizontally displaced from an adjacent graphical identifier in the user interface 600. The graphical identifiers 602, 604, 606, 608, 610, 612, 614, 616 are also separated in the user interface 400 such that graphical identifiers do not share any common borders. Even further, the size of each of the graphical identifiers 602, 604, 606, 608, 610, 612, 614, 616 is variable. In some embodiments, the size of each graphical identifier can be based on a frequency of communication between a user of the telecommunications device and the contact associated with the respective graphical identifier. In other embodiments, an initial position on the display of at least one graphical identifier can be determined as a function of the frequency of communication between the user and the contact associated with the respective at least one graphical identifier.

Figure 7:
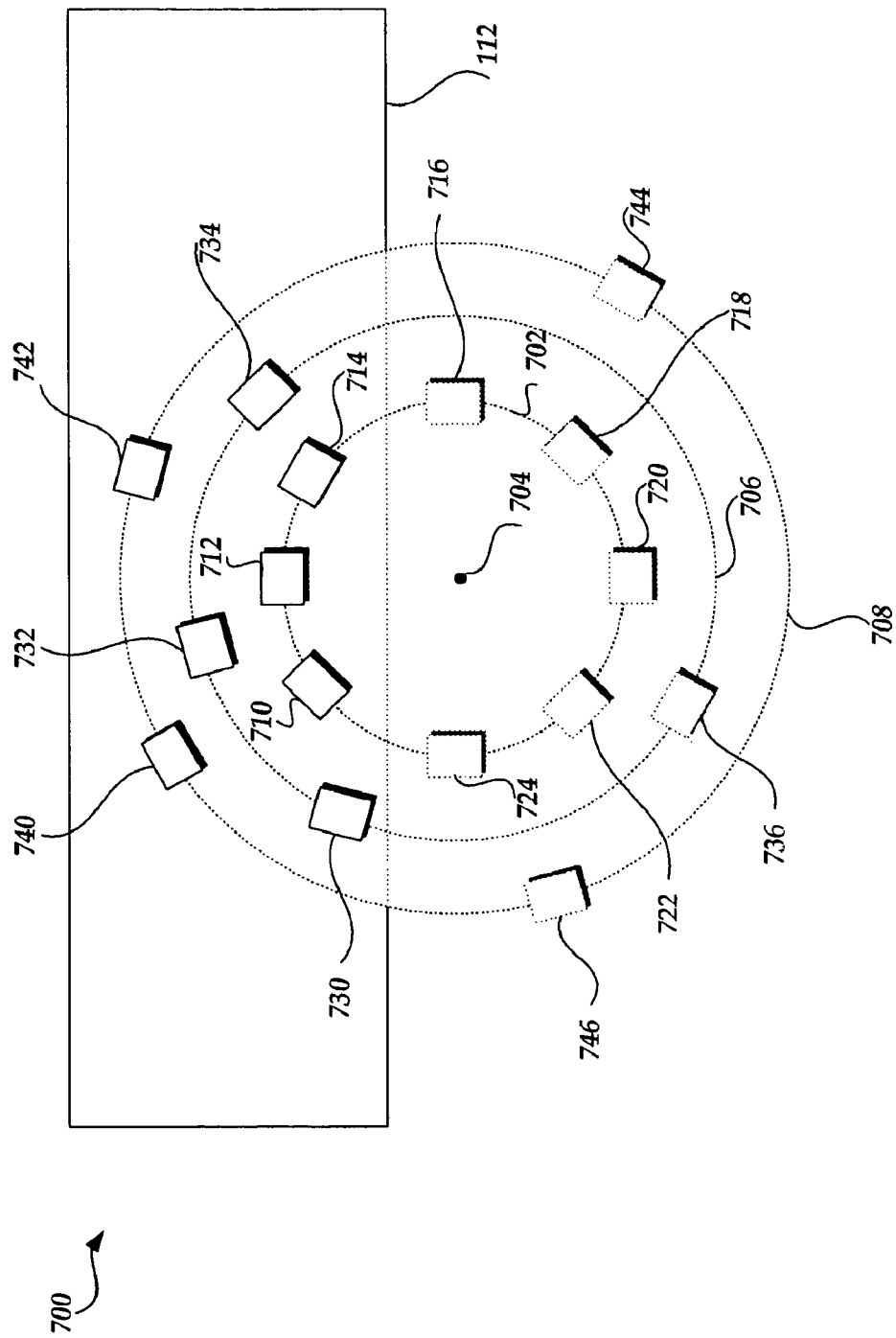
FIG. 7 is an illustrative diagram of a top perspective view of an axis relative to and external to a telecommunications device, as well as a multiple perceived paths about which at least one set of graphical identifiers appear to rotate.

With reference now to FIG. 7, in another embodiment, a top perspective view 700 is provided illustrating a plurality of different paths 702, 706, 708 along which a set of graphical identifiers 710, 712, 714, 716, 718, 720, 722, 724, 730, 732, 734, 736, 740, 742, 744, 746 emulates rotation about an axis 704. As set forth throughout this description, each of the graphical identifiers corresponds to a contact of the at least one subset of user contacts. In addition, the graphical identifiers are positioned in an arrangement about an external axis. As shown in FIG. 7, the axis 704 is positioned external to the display of the telecommunications device 112. In this embodiment, the arrangement includes a plurality of paths 702, 706, 708 along which the graphical identifiers 710, 712, 714, 716, 718, 720, 722, 724, 730, 732, 734, 736, 740, 742, 744, 746 are positioned. Upon receipt of one or more user navigation inputs, at least a portion of the graphical identifiers 710, 712, 714, 716, 718, 720, 722, 724, 730, 732, 734, 736, 740, 742, 744, 746 emulate rotation along at least one of the paths 702, 706, 708 about the axis 704. While FIG. 7 illustrates three paths 702, 706, 708 in a plurality of path arrangement about the external axis 704, one skilled in the relevant art will appreciate that the plurality of path arrangement can correspond to two or more paths.

In one illustrative embodiment, the set of graphical identifiers 710, 712, 714, 716, 718, 720, 722, 724, 730, 732, 734, 736, 740, 742, 744, 746 corresponds to a first subset of contacts selected at least in part by the user of the telecommunications device 112. In this embodiment, a first portion 710, 712, 714, 716, 718, 720, 722, 724 of the graphical identifiers are positioned along the first path 702; a second portion 730, 732, 734, 736 of the graphical identifiers are positioned along the second path 706; and a third portion 740, 742, 744, 746 of the graphical identifiers are positioned along the third path 708. As will be set forth further below, a number of embodiments exist with regard to determining how a particular graphical identifier (or the associated user contact) is associated with a particular path.

In one embodiment, the contact management module 222 of the telecommunications device 112 may determine an order associated with the user's selection of each contact as a member of the first subset. For each graphical identifier associated with a contact from the first subset of contacts, the contact management module 222 can determine whether the graphical identifier should be positioned about the external axis 704 along the first, second, or third paths based on the order of the user's selection of the associated contact as a member of the first subset. For example, the graphical identifiers associated with the first 8 selected user contacts can be included in the first path. In some embodiments, the first path may be defined as path having the shortest distance to the axis 704 (e.g., path 702 in FIG. 7) to provide the perception that contacts positioned along this path are closest, and perhaps most important, to a user of the telecommunication device 112. The graphical identifiers associated with the next 4 selected user contacts can then be included in a second path (e.g., path 706 in FIG. 7), while the graphical identifiers associated with the last 4 selected contacts can be included in a third path (e.g., path 708 in FIG. 7).

Alternatively, in another embodiment, the contact management module 222 can automatically determine which path from the plurality of paths 702, 706, 708 in which to position the graphical identifiers based on one or more organizational criteria or factors. The organizational criteria can include, for example, organization or affiliation criteria, event-based or event driven criteria, topic or keyword-based criteria, and the like. For example, a path from the plurality of paths can correspond to an organization or affiliation criteria (e.g., an Alumni Association), and any contacts having an association with that criteria would be located along the respective path. As other examples, a path from the plurality of paths can correspond to an event-based or event driven criteria (e.g., an upcoming or current trip to Hawaii) or a topic or keyword-based criteria (e.g., Family). Any contacts having an association with either of these criteria would be located along the corresponding path. Other factors may additionally or alternatively be considered in identifying a path from the plurality of paths for each of the graphical identifiers associated with a contact in the first subset of contacts, such as frequency of communication between the user and each contact in the first subset as similarly set forth above in other embodiments.

Even further, in another alternative embodiment, the association of the graphical identifiers with a path from the plurality of paths can be manually configured and/or managed according to user-specified criteria or based on specific user selection.

In a further illustrative embodiment, as shown in FIG. 7, at least some of the first portion of graphical identifiers 710, 712, 714 positioned along the first path 702 are simultaneously displayed on the telecommunications device 112 with at least some of the second portion of graphical identifiers 730, 732, 734 positioned along the second path 706. The simultaneous display of at least some portion of graphical identifiers associated with each path may extend to any two or more paths from the plurality of paths. Accordingly, as shown in FIG. 7, at least some portion of the graphical identifiers associated with each of the first, second, and third paths 702, 706, 708 are simultaneously displayed on the telecommunication device. The remaining portion of the graphical identifiers associated with each path is shown in phantom along the respective path to demonstrate the emulated rotation in response to one or more user navigation inputs. The graphical identifiers that can be seen by a user on the display of the telecommunications device 112 thus appear to rotate along a portion of their respective paths 702, 706, 708 about the external axis 704. The direction of emulated rotation for each of the paths may also vary. All paths may rotate in the same direction, while in other embodiments any one or more paths may rotate in an opposite direction from the remaining paths in the arrangement. Even further, the speed at which the graphical identifiers along each path emulate rotation about the external axis 704 may vary. Accordingly, a speed of emulated rotation along the first path can be different from a speed of emulated rotation along the second or third paths.

In a still further embodiment, each path from the plurality of paths 702, 706, 708 in the arrangement about the external axis 704 may be selectable and individually rotatable about the axis 704. Moreover, each path may be selectable in order to facilitate communication with a contact positioned in the selected path. A selected path and associated graphical identifiers may come into focus relative to an unselected path in any number of ways, including any of those discussed above with respect to graphical identifiers coming into focus in a focal position as compared to other non-focal positions on the display. As also similarly described above, an individual graphical identifier in a selected path may further come into focus upon selection of the graphical identifier by the user via any one of a variety of input methods and devices.

Figure 8:
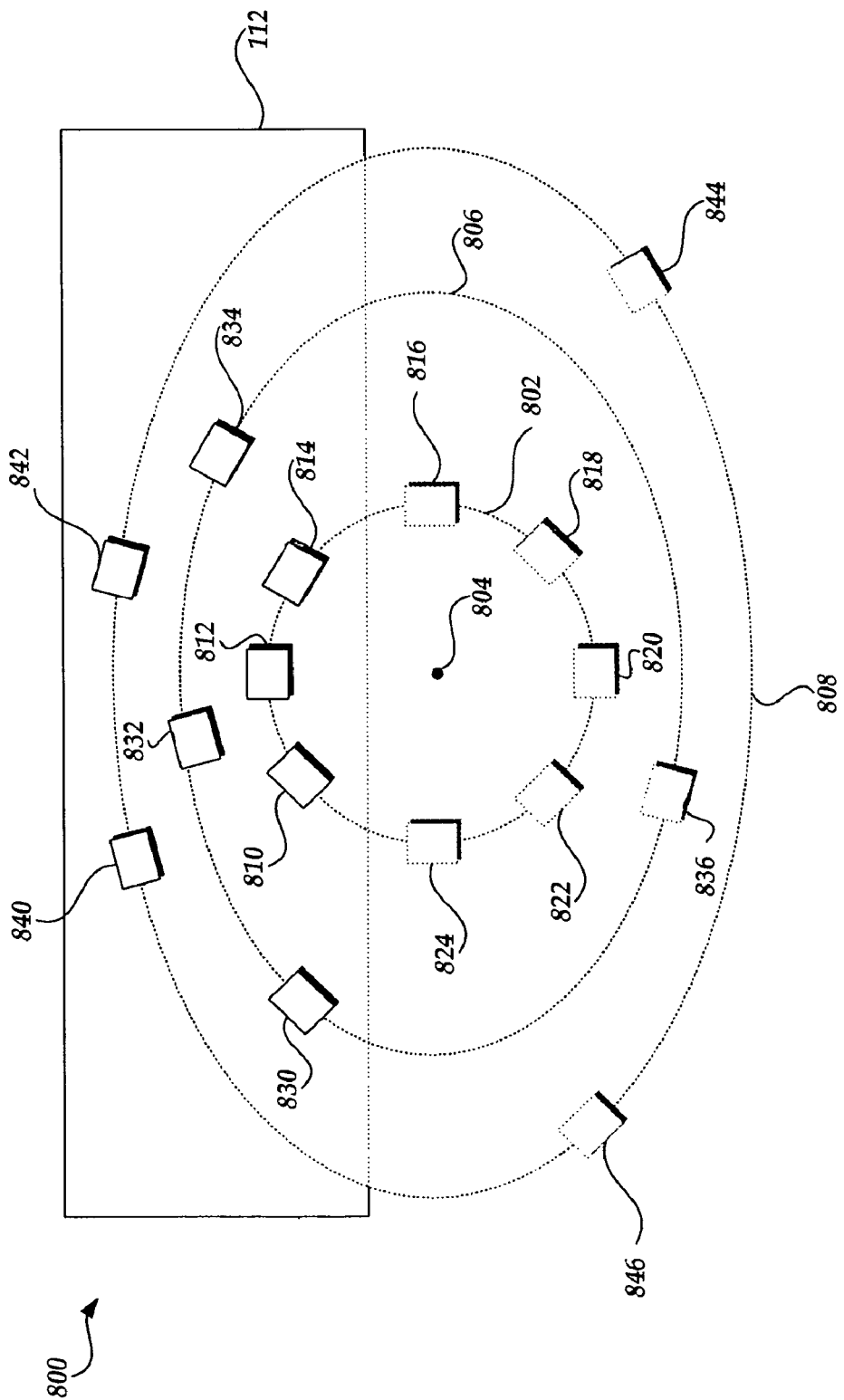
FIG. 8 is an illustrative diagram of a top perspective view of another embodiment of an axis relative to and external to a telecommunications device, as well as multiple perceived paths about which at least one set of graphical identifiers appear to rotate.
Figure 9:
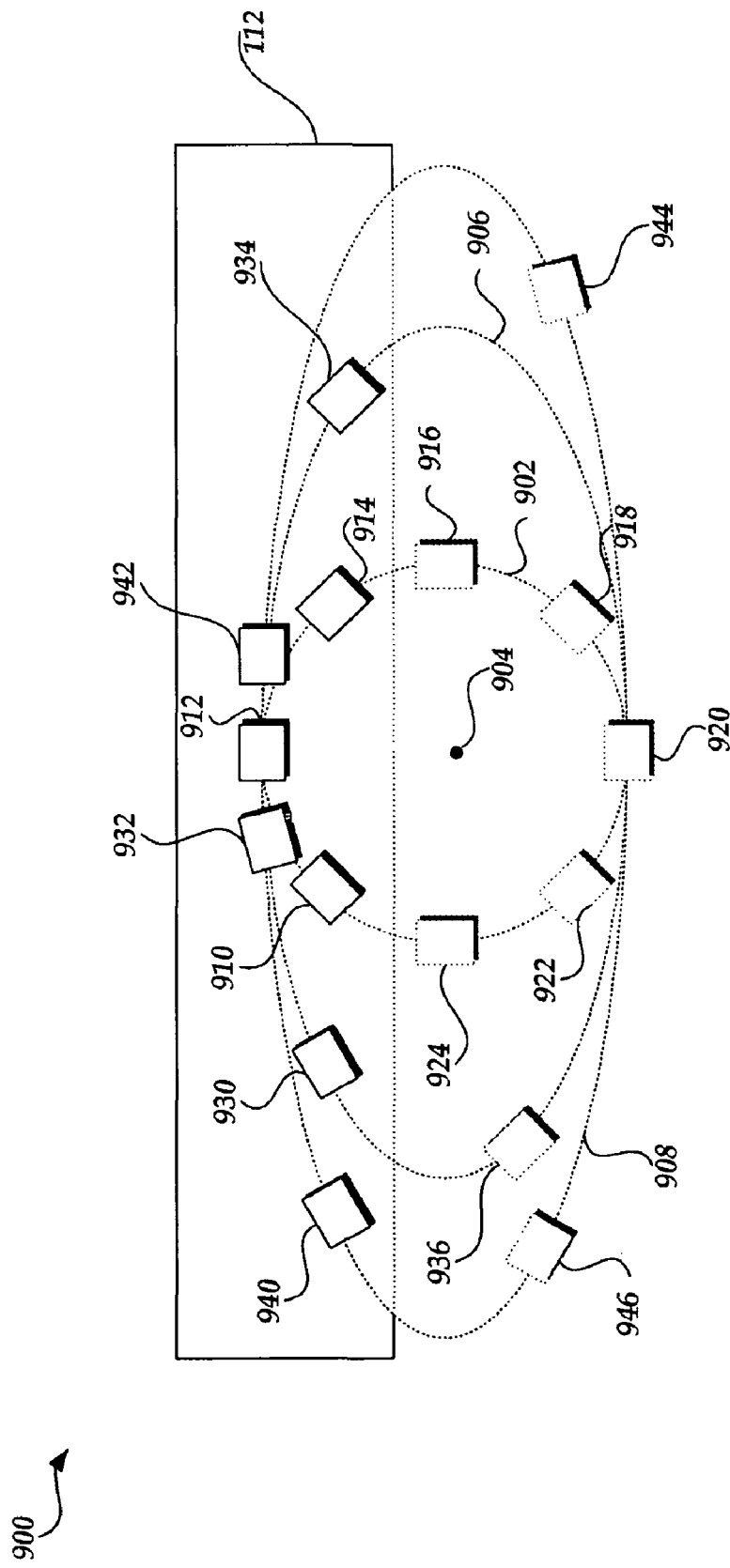
FIG. 9 is an illustrative diagram of a top perspective view of an axis relative to and external to a telecommunications device, as well as multiple perceived intersecting paths about which at least one set of graphical identifiers appear to rotate.

In another embodiment, in an arrangement having a plurality of paths, the paths may share a common axis as shown in any of FIGS. 7-9. Alternatively, each path may emulate rotation about a different external axis as will be described in reference to FIG. 10. In either of these multiple path arrangements, the shape of each of the paths may vary or remain constant. For example, the shape of the paths 702, 706, 708 illustrated in FIG. 7 is circular or cylindrical, while the shape of each of the paths illustrated in FIG. 8 varies. Moreover, each path may be defined as a different function of distance from the external axis, as shown in each of FIGS. 7-10. Alternatively, each path in a multiple path arrangement may be defined as the same function of distance from the external axis within any given band of planes intersecting the external axis. In this embodiment, each path has the same top view footprint, but is positioned in a different band of planes intersecting the external axis. Accordingly, in one example of this embodiment, only a single path may be presented on the display of the telecommunications device 112 at any given time. A user may navigate to another path defined by a different band of planes intersecting the common external axis via one of a variety of input methods and devices, such as selection of an up or down arrow key, up or down touch screen navigation gesture, up or down movement of a track ball, and the like.

With reference now to FIG. 8, an alternate embodiment of a plurality of paths arrangement about an axis positioned external to the display of a telecommunications device is provided. FIG. 8 specifically provides a top perspective view 800 illustrating a plurality of different paths 802, 806, 808 along which a set of graphical identifiers 810, 812, 814, 816, 818, 820, 822, 824, 830, 832, 834, 836, 840, 842, 844, 846 emulates rotation about an axis 804 positioned external to the display of a telecommunications device 112. The plurality of paths arrangement in FIG. 8 is substantially identical to the plurality of paths arrangement described above in reference to FIG. 7 with the following exceptions. Each of the paths 802, 806, 808 in FIG. 8 is defined as a different function of distance from the external axis 804. In addition, the paths 802, 806, and 808 have varying shapes.

With reference now to FIG. 9, another alternate embodiment of a plurality of paths arrangement about an axis positioned external to the display of a telecommunications device is provided. FIG. 9 specifically provides a top perspective view 900 illustrating a plurality of different intersecting paths 902, 906, 908 along which a set of graphical identifiers 910, 912, 914, 916, 918, 920, 922, 924, 930, 932, 934, 936, 940, 942, 944, 946 emulates rotation about an axis 904 positioned external to the display of a telecommunications device 112. The plurality of paths arrangement in FIG. 9 is substantially identical to the plurality of paths arrangement described above in reference to FIG. 8 with the following exceptions. The paths 902, 906, 908 in FIG. 9 are intersecting paths. In one embodiment, as shown in FIG. 9, the paths 902, 906, 908 intersect at one point within the display of the telecommunications device 112. The intersecting location of the paths on the display can correspond to a first position in the arrangement of graphical identifiers about the external axis 904. Even further, the first position can correspond, in some embodiments, to a focal position. As similarly set forth above, a graphical identifier located in the focal position can be emphasized relative to the other displayed graphical identifiers, such as by being highlighted, having greater dimensions than the other displayed graphical identifiers, and the like.

Figure 10:
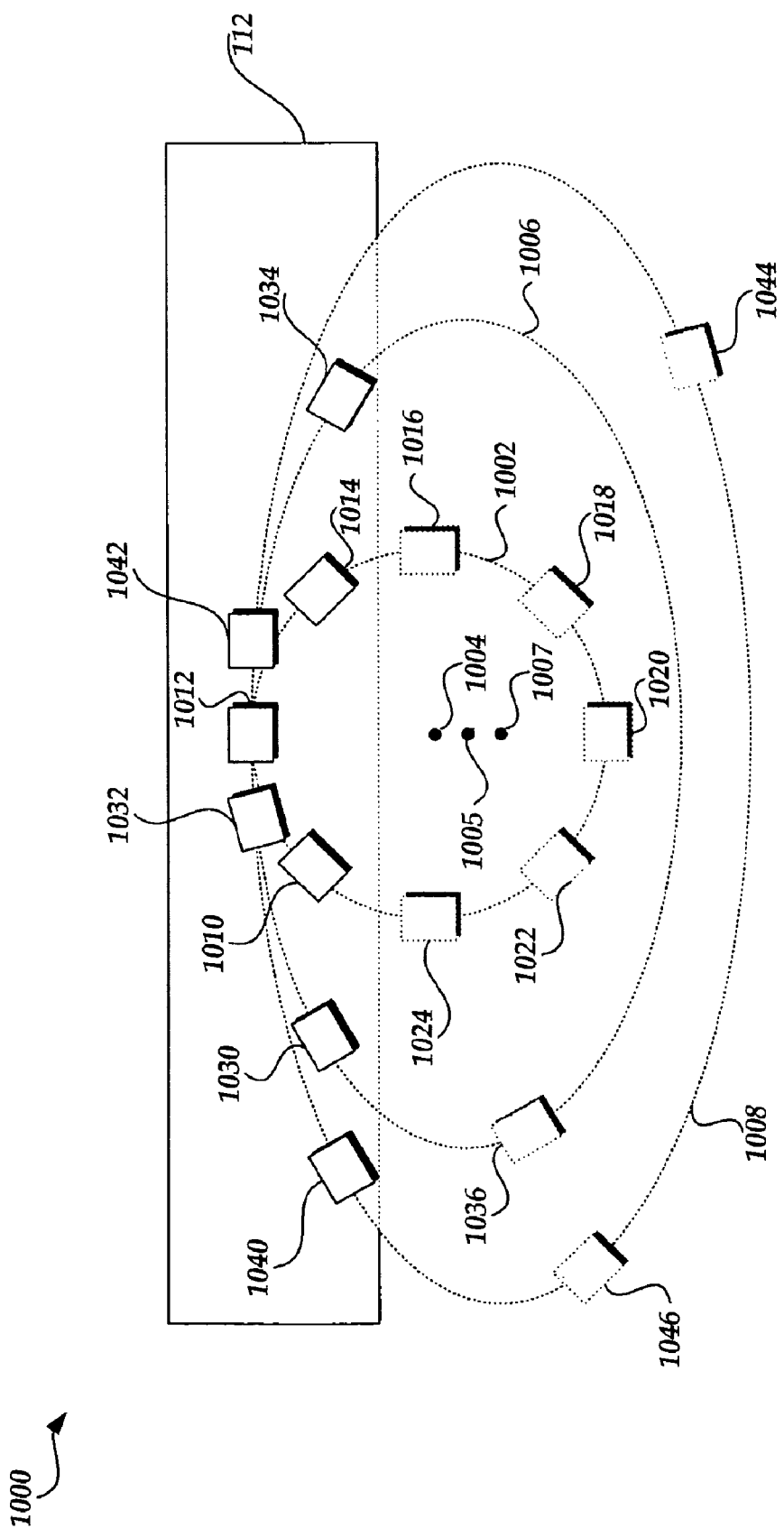
FIG. 10 is an illustrative diagram of a top perspective view of another embodiment of an axis relative to and external to a telecommunications device, as well as multiple perceived intersecting paths about which at least one set of graphical identifiers appear to rotate.

With reference now to FIG. 10, yet another alternate embodiment of a plurality of paths arrangement about an axis positioned external to the display of a telecommunications device is provided. FIG. 10 specifically provides a top perspective view 1000 illustrating a plurality of different intersecting paths 1002, 1006, 1008 along which a set of graphical identifiers 1010, 1012, 1014, 1016, 1018, 1020, 1022, 1024, 1030, 1032, 1034, 1036, 1040, 1042, 1044, 1046 emulates rotation about different axes 1004, 1005, 1007, each positioned external to the display of a telecommunications device 112. The plurality of paths arrangement in FIG. 10 is substantially identical to the plurality of paths arrangement described above in reference to FIG. 9 with the following exceptions. The paths 902, 906, 908 are each defined as a function of distance to a different external axis. In particular, in one illustrative embodiment, a first portion 1010, 1012, 1014, 1016, 1018, 1020, 1022, 1024 of the graphical identifiers are positioned along the first path 1002 about a first axis 1004; a second portion 1030, 1032, 1034, 1036 of the graphical identifiers are positioned along the second path 1006 about a second axis 1005; and a third portion 1040, 1042, 1044, 1046 of the graphical identifiers are positioned along the third path 1008 about a third axis 1007. The first, second, and third axes 1004, 1005, 1007 are different. In one embodiment, each of the first, second, and third axes 1004, 1005, 1007 is a center axis.

The following paragraphs provide yet other possible illustrative use cases, including various embodiments regarding how the contact management module 222 manages contacts, causes display of at least one set of graphical identifiers associated with at least one subset of user contacts, and provides additional functionality in response to user inputs or event data.

As set forth above, and with respect to the plurality of paths embodiments in particular, the foregoing discussion has been directed to a set of graphical identifiers corresponding to a first subset of contacts selected at least in part by a user of the telecommunications device. This set of graphical identifiers can then be divided such that some of the graphical identifiers are positioned along a first path, while other graphical identifiers from the set are positioned along one or more additional paths. In a further alternative embodiment, the contact management module 222 of the telecommunications device 112 may identify two or more subsets of contacts, at least one of which is selected at least in part by a user of the telecommunications device 112 as similarly set forth above for a single subset of user contacts. Accordingly, in this embodiment, the contact management module 222 can cause the generation of a first path-based information display in which a first set of graphical identifiers is associated with a first subset of user contacts and a second path-based information display in which a second set of graphical identifiers is associated with a second subset of user contacts (where two separate subsets of user contacts have been identified). In the first path-based information display, the first set of graphical identifiers are further associated with a first path about a first axis positioned external to the display of the telecommunications device 112. Similarly, in the second path-based information display, the second set of graphical identifiers are associated with a second path about a second axis positioned external to the display of the telecommunications device 112. Essentially, the contact management routine described above in reference to FIG. 3 can be repeated as necessary for each subset of user contacts to be identified, and then graphical identifiers for each subset can be positioned along a different path about one or more axes external to the display of the telecommunications device 112 as similarly described above in the plurality of paths arrangements and embodiments.

In an illustrative embodiment, the contact management module 222 may identify a first subset of contacts selected at least in part by a user of the telecommunications device. The first subset of contacts may, for example, correspond to the subset of contacts that the user deems most important. However, the user may want to identify a second subset of contacts different from the first. The second subset of contacts may, for example, correspond to a subset of contacts that the user calls most regularly at work. The user may directly select the work contacts as members of the second subset. Alternatively, the user may select a criteria, such as frequency of communications made by the user to any of the user's contacts during normal business hours, and allow the contact management module 222 to automatically select the second subset based on the user selected criteria.

It will be appreciated by one skilled in the relevant art that the foregoing plurality of paths embodiments associated with a single subset of user contacts may similarly apply to the plurality of paths embodiment in which each path is associated with a different subset of user contacts.

In yet another embodiment, the contact management module 222 may additionally be operative to generate a display, in response to a user input, that would replace any of the path-based information displays described above with a display including each of the graphical identifiers associated with a contact in one or more subsets of user contacts. In particular, this condensed display would be in a different format than the path-based information displays. For example, the condensed display may be a grid format or any other format that lends itself to simultaneously displaying all of the graphical identifiers associated with the one or more subsets of contacts on the display of the telecommunications device 112. Accordingly, in this embodiment, a user can decide whether to move from a path-based information display in which only a portion of the graphical identifiers associated with one or more subsets of contacts are displayed at any given time, to a display in which all such graphical identifiers come into view.

In a still further embodiment, the contact management module 222 may additionally be operative to cause at least one graphical identifier to be displayed in an out-of-band position relative to any of the above-described path-based arrangements of graphical identifiers based on any number of criteria. The out-of-band position corresponds to any position not included in any of the path-based arrangements. For example, if a user has not had any communications with a particular contact in the at least one subset of contacts for some predetermined amount of time, the graphical identifier corresponding to that contact may transition out of the path-based arrangement on the display to an out-of-band position such as in a corner of the display. This transition can provide the effect that the contact is becoming more distant, and as such the corresponding graphical identifier may also be reduced in size relative to any other displayed graphical identifier.

Additionally, rather than being exclusively applicable to user contacts, any of the foregoing embodiments may be equally applicable to individual contacts, groups of contacts each represented by a single graphical identifier, applications, other executable components, or any combination thereof, determined from a larger set. Such individual contacts, groups of contacts each represented by a single graphical identifier, applications, other executable components, or any combination thereof are generally referred to as selectable components.

It will further be appreciated by those skilled in the art and others that all of the functions described in this disclosure may be embodied in software executed by one or more processors of the disclosed components. The software may be persistently stored in any type of non-volatile storage. Moreover, when reference is made to a module and/or component performing any action, it will be appreciated by one skilled in the art that any such actions are implemented through execution of software code through one or more pieces of hardware regardless of whether specific hardware is identified.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A non-transitory computer-readable medium having a computer-executable component, implemented by executing instructions on a processor associated with a telecommunications device, the computer-executable component comprising: a contact management component operative to: identify a subset of contacts selected at least in part by a user of a telecommunications device, wherein the subset of contacts includes a portion of the user's contacts accessible by the telecommunications device, wherein the subset of contacts includes at least two contacts, and wherein a first portion of the subset of contacts is selected by the user of the telecommunications device and a remaining portion of the subset of contacts is determined automatically as a function of an organizational criteria; and cause display of a graphical identifier associated with each contact of the subset of contacts in an arrangement about an axis, wherein the axis is positioned external and substantially parallel to the display of the telecommunications device, wherein the arrangement includes a first path about the axis along which a portion of the graphical identifiers are positioned and a second path about the axis along which a remaining portion of the graphical identifiers are positioned, and wherein the graphical identifiers are rotatable along the first and second paths about the axis; wherein the first path is different from the second path.

2. The non-transitory computer-readable medium as recited in claim 1, wherein each user contact corresponds to a different person.

3. The non-transitory computer-readable medium as recited in claim 1, wherein each user contact corresponds to a different identifier associated with a person.

4. The non-transitory computer-readable medium as recited in claim 3, wherein the identifier corresponds to a telephone number.

5. The non-transitory computer-readable medium as recited in claim 1, wherein a shape of the first path is different from a shape of the second path.

6. The non-transitory computer-readable medium as recited in claim 1, wherein a shape of the first path is the same as a shape of the second path.

7. The non-transitory computer-readable medium as recited in claim 1, wherein the first path and the second path do not intersect.

8. The non-transitory computer-readable medium as recited in claim 1, wherein the first path and the second path intersect at a position on the display of the telecommunications device.

9. The non-transitory computer-readable medium as recited in claim 8, wherein the intersecting position corresponds to a focal position.

10. The non-transitory computer-readable medium as recited in claim 9, wherein a graphical identifier located in the focal position is highlighted.

11. The non-transitory computer-readable medium as recited in claim 9, wherein a graphical identifier located in the focal position has greater dimensions than the other displayed graphical identifiers.

12. The non-transitory computer-readable medium as recited in claim 9, wherein each graphical identifier located in a position other than the focal position is faded relative to a graphical identifier located in the focal position.

13. A method comprising: identifying a subset of contacts selected at least in part by a user of a telecommunications device, wherein the subset of contacts includes a portion of the user's contacts accessible by the telecommunications device, wherein the subset of contacts includes at least two contacts, and wherein a first portion of the subset of contacts is selected by the user of the telecommunications device and a remaining portion of the subset of contacts is determined automatically as a function of a criteria associated with the user's contacts accessible by the telecommunications device; and causing display of a graphical identifier associated with each contact of the subset of contacts in an arrangement about an axis, wherein the axis is positioned external and substantially parallel to the display of the telecommunications device, wherein the arrangement includes a first path about the axis and a second path about the axis, and wherein the graphical identifiers are rotatable along the first and second paths about the axis; wherein the method is implemented by a computing system.

14. The method as recited in claim 13, wherein a first portion of the graphical identifiers associated with the subset of contacts are caused to be displayed along the first path about the axis, and wherein a remaining portion of the graphical identifiers associated with the subset of contacts are caused to be displayed along the second path about the axis.

15. The method as recited in claim 14, wherein at least some of the first portion of graphical identifiers positioned along the first path are simultaneously displayed on the telecommunications device with at least some of the remaining portion of graphical identifiers positioned along the second path.

16. The method as recited in claim 14 further comprising: causing the first portion of graphical identifiers to emulate rotation along the first path about the axis in response to a user navigation input.

17. The method as recited in claim 16 further comprising: causing the remaining portion of the graphical identifiers to emulate rotation along the second path about the axis in response to the user navigation input.

18. The method as recited in claim 17, wherein a speed of the emulated rotation along the first path is different from a speed of the emulated rotation along the second path.

19. The method as recited in claim 14, wherein the first path and the second path are each determined as a function of distance from the axis.

20. The method as recited in claim 19, wherein the first path and the second path are different.

21. The method as recited in claim 13 further comprising: determining an order associated with the user's selection of a contact as a member of the subset of contacts; and for each graphical identifier associated with a contact in the subset of contacts, determining whether the respective graphical identifier is positioned in the arrangement along the first path or second path based, at least in part, on the order of the user's selection.

22. The method as recited in claim 13 further comprising: for each graphical identifier associated with a contact in the subset of contacts, determining whether the respective graphical identifier is positioned in the arrangement along the first path or second path based on an organizational criteria.

23. A method comprising: identifying a subset of contacts selected at least in part by a user of a telecommunications device, wherein the subset of contacts includes a portion of the user's contacts accessible by the telecommunications device, wherein the subset of contacts includes at least two contacts, and wherein the subset of contacts also includes one or more contacts selected automatically as a function of a criteria associated with the user's contacts accessible by the telecommunications device; and causing display of at least some of a first portion of the subset of contacts along a first path about an axis, wherein the axis is positioned external and substantially parallel to the display of the telecommunications device and wherein the at least some of the first portion of the subset of contacts are rotatable along the first path about the axis; and causing display of at least some of a second portion of the subset of contacts along a second path about the axis, wherein the at least some of the second portion of the subset of contacts are rotatable along the second path about the axis; wherein the method is implemented by a computing system.

24. The method as recited in claim 23, wherein the first path and the second path are different.

25. The method as recited in claim 23, wherein the second portion comprises a remaining portion of the subset of contacts.

26. The method as recited in claim 23 further comprising: causing display of at least some of a third portion of the subset of contacts along a third path about the axis.

27. The method as recited in claim 26, wherein the first path, the second path, and the third path are different.

28. The method as recited in claim 23, wherein the first and second path are each selectable to facilitate communication with a contact positioned in the corresponding selected path.

29. The method as recited in claim 28 further comprising: determining selection of the first path in response to a user selection input; and causing the first portion of the subset of contacts to emulate rotation along the first path about the axis in response to a user navigation input.

30. The method as recited in claim 29 further comprising: determining selection of the second path in response to a second user selection input; and causing the second portion of the subset of contacts to emulate rotation along the second path about the axis in response to a user navigation input.

31. The method as recited in claim 23 further comprising: causing simultaneous display of each contact in the subset of contacts on the telecommunications device in response to a user input.

32. The method as recited in claim 23, wherein the first path and the second path correspond to a first format.

33. The method as recited in claim 32 further comprising: causing each of the subset of contacts to be displayed on the telecommunications device in a format different from the first format in response to a user input.

34. The method as recited in claim 33, wherein the different format is a grid format.

35. The method as recited in claim 23 further comprising: causing display of a first contact in the subset of contacts in an out-of-band position relative to the first and second paths.

36. The method as recited in claim 35, wherein the first contact is caused to be displayed in an out-of-band position based on a frequency of communication between the user and the first contact.

37. A method comprising: identifying a subset of selectable components selected at least in part by a user of a telecommunications device, wherein the subset of selectable components includes a portion of the user's selectable components accessible by the telecommunications device, wherein the subset of selectable components includes at least two selectable components, and wherein the subset of selectable components also includes one or more selectable components selected automatically as a function of an organizational criteria; and causing display of at least some of a first portion of the subset of selectable components along a first path about an axis, wherein the axis is positioned external and substantially parallel to the display of the telecommunications device and wherein the at least some of the first portion of the subset of selectable components are rotatable along the first path about the axis; and causing display of at least some of a second portion of the subset of selectable components along a second path about the axis, wherein the at least some of the second portion of the subset of selectable components are rotatable along the second path about the axis; wherein the method is implemented by a computing system.

38. The method as recited in claim 37, wherein selectable components include at least one of individual user contacts, groups of contacts each represented by a single graphical identifier, applications, and other executable components.

* * * * *